United States Patent
Fan et al.

(10) Patent No.: US 12,003,326 B2
(45) Date of Patent: Jun. 4, 2024

(54) DATA TRANSMISSION METHOD AND APPARATUS

(71) Applicant: Huawei Technologies Co., Ltd., Shenzhen (CN)

(72) Inventors: Qiang Fan, Hefei (CN); Chunhua You, Shanghai (CN); Chong Lou, Shanghai (CN); Yibin Zhuo, Shenzhen (CN); Mingzeng Dai, Shenzhen (CN); Jun Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 493 days.

(21) Appl. No.: 17/205,641

(22) Filed: Mar. 18, 2021

(65) Prior Publication Data
US 2021/0211239 A1    Jul. 8, 2021

Related U.S. Application Data

(63) Continuation of application No. PCT/CN2019/106181, filed on Sep. 17, 2019.

(30) Foreign Application Priority Data

Sep. 18, 2018   (CN) .......................... 201811090216.6

(51) Int. Cl.
H04W 4/40      (2018.01)
H04L 1/1812    (2023.01)
H04W 92/18     (2009.01)

(52) U.S. Cl.
CPC ............. *H04L 1/1812* (2013.01); *H04W 4/40* (2018.02); *H04W 92/18* (2013.01)

(58) Field of Classification Search
CPC ..... H04W 76/22; H04W 36/12; H04W 36/38; H04W 76/10; H04W 76/11; H04W 36/00; H04W 36/0011
(Continued)

(56) References Cited

U.S. PATENT DOCUMENTS 10,568,007 B2 *  2/2020  Park ....................... H04W 36/30
11,206,596 B2 * 12/2021  Chen ..................... H04W 36/36
(Continued)

FOREIGN PATENT DOCUMENTS

CN    103026650 A    4/2013
CN    105991247 A    10/2016
(Continued)

OTHER PUBLICATIONS

LG Electronics Inc., "LTE sidelink enhancement for reliability and QoS", 3GPP TSG-RAN2 Meeting #96, R2-168769, Reno, NV, USA, Nov. 14-18, 2016, 2 pages.
(Continued)

*Primary Examiner* — Nathan S Taylor
(74) *Attorney, Agent, or Firm* — Slater Matsil, LLP

(57) ABSTRACT

A first terminal device has first data to be transmitted on a sidelink and has second data to be transmitted on an uplink. The first terminal device performs medium access control MAC protocol data unit PDU assembly on the first data or does not perform MAC PDU assembly on the first data based on a result of comparison between a transmission priority of the first data and a transmission priority of the second data.

20 Claims, 6 Drawing Sheets

(58) Field of Classification Search
USPC .......................................................... 370/32
See application file for complete search history.

(56) References Cited

U.S. PATENT DOCUMENTS

| | | | | |
|---|---|---|---|---|
| 11,503,450 | B2* | 11/2022 | Zhang | H04W 72/20 |
| 2017/0094656 | A1* | 3/2017 | Chen | H04W 76/14 |
| 2017/0127405 | A1* | 5/2017 | Agiwal | H04W 72/51 |
| 2017/0150330 | A1* | 5/2017 | Kim | H04W 76/10 |
| 2017/0171690 | A1* | 6/2017 | Kim | H04L 67/125 |
| 2017/0215154 | A1* | 7/2017 | Kim | H04B 17/318 |
| 2017/0230959 | A1 | 8/2017 | Wu et al. | |
| 2017/0280469 | A1* | 9/2017 | Park | H04W 72/0446 |
| 2017/0311227 | A1* | 10/2017 | Kim | H04W 40/10 |
| 2017/0374539 | A1* | 12/2017 | Chae | H04L 5/00 |
| 2018/0013521 | A1* | 1/2018 | Lee | H04L 1/1851 |
| 2018/0048994 | A1* | 2/2018 | Kwon | H04W 4/021 |
| 2018/0070371 | A1* | 3/2018 | Shin | H04W 72/23 |
| 2018/0139724 | A1* | 5/2018 | Loehr | H04W 72/02 |
| 2018/0146478 | A1* | 5/2018 | Kim | H04W 72/23 |
| 2018/0146491 | A1* | 5/2018 | Kim | H04W 24/10 |
| 2018/0176891 | A1* | 6/2018 | Kim | H04L 5/0037 |
| 2018/0176955 | A1* | 6/2018 | Salem | H04W 74/0808 |
| 2018/0234973 | A1* | 8/2018 | Lee | H04W 24/08 |
| 2018/0242190 | A1* | 8/2018 | Khoryaev | H04L 47/32 |
| 2018/0332564 | A1* | 11/2018 | Lee | H04L 67/12 |
| 2019/0007974 | A1* | 1/2019 | Nguyen | H04W 4/44 |
| 2019/0014564 | A1* | 1/2019 | Lee | H04W 72/121 |
| 2019/0037442 | A1* | 1/2019 | Yi | H04L 5/0048 |
| 2019/0045465 | A1* | 2/2019 | Lee | H04W 92/18 |
| 2019/0045521 | A1* | 2/2019 | Hong | H04W 72/20 |
| 2019/0053251 | A1* | 2/2019 | Loehr | H04W 72/1263 |
| 2019/0058986 | A1* | 2/2019 | Loehr | H04L 1/1825 |
| 2019/0116586 | A1* | 4/2019 | Basu Mallick | H04W 64/00 |
| 2019/0116609 | A1* | 4/2019 | Feng | H04W 4/46 |
| 2019/0150147 | A1* | 5/2019 | Lee | H04W 72/0446 370/336 |
| 2019/0182840 | A1* | 6/2019 | Feng | H04W 74/0816 |
| 2019/0254059 | A1* | 8/2019 | Gulati | H04W 72/542 |
| 2019/0254091 | A1* | 8/2019 | Kim | H04L 5/0078 |
| 2019/0268799 | A1* | 8/2019 | Hong | H04W 4/70 |
| 2019/0281588 | A1* | 9/2019 | Zhang | H04B 7/0617 |
| 2019/0289615 | A1* | 9/2019 | Lee | H04W 4/40 |
| 2019/0313375 | A1* | 10/2019 | Loehr | H04W 72/04 |
| 2019/0349895 | A1* | 11/2019 | Liu | H04L 5/0094 |
| 2020/0092685 | A1* | 3/2020 | Fehrenbach | H04W 84/047 |
| 2020/0127768 | A1* | 4/2020 | Seo | H04B 7/0626 |
| 2020/0169986 | A1* | 5/2020 | Lee | H04W 72/542 |
| 2020/0221522 | A1* | 7/2020 | Shimezawa | H04W 76/15 |
| 2020/0245173 | A1* | 7/2020 | Kusashima | H04B 17/24 |
| 2020/0389883 | A1* | 12/2020 | Faxér | H04L 5/0053 |
| 2021/0112582 | A1* | 4/2021 | Lee | H04W 72/535 |
| 2021/0136699 | A1* | 5/2021 | Scholand | H04W 4/40 |
| 2021/0227491 | A1* | 7/2021 | Shin | H04W 74/0833 |
| 2021/0227575 | A1* | 7/2021 | Ou | H04W 76/11 |
| 2022/0007230 | A1* | 1/2022 | Chen | H04W 72/21 |

FOREIGN PATENT DOCUMENTS

| | | | | |
|---|---|---|---|---|
| CN | 107466068 | A | | 12/2017 |
| CN | 107666647 | A | | 2/2018 |
| CN | 108347313 | A | | 7/2018 |
| EP | 3282618 | A1 | | 2/2018 |
| EP | 3609254 | A1 * | | 2/2020 |
| EP | 3100374 | B1 * | | 12/2021 |
| EP | 4013122 | A1 * | 6/2022 | H04B 17/309 |
| WO | WO-2016144574 | A1 * | 9/2016 | |
| WO | WO-2016159845 | A1 * | 10/2016 | |
| WO | WO-2017171897 | A1 * | 10/2016 | |
| WO | 2017026844 | A1 | 2/2017 | |
| WO | 2017073944 | A1 | 5/2017 | |
| WO | 2017160351 | A1 | 9/2017 | |
| WO | WO-2017171897 | A1 * | 10/2017 | |
| WO | 2017196032 | A1 | 11/2017 | |
| WO | WO-2018029023 | A1 * | 2/2018 | H04L 1/08 |
| WO | 2018074876 | A1 | 4/2018 | |
| WO | 2018113678 | A1 | 6/2018 | |
| WO | WO-2019052627 | A1 * | 3/2019 | H04L 1/0035 |
| WO | WO-2020006366 | A1 * | 1/2020 | H04L 27/26025 |
| WO | WO-2020032530 | A1 * | 2/2020 | |
| WO | WO-2020033381 | A1 * | 2/2020 | H04W 24/08 |
| WO | WO-2020033422 | A1 * | 2/2020 | H04W 28/0268 |
| WO | WO-2020033628 | A1 * | 2/2020 | |

OTHER PUBLICATIONS

Huawei (RAPPORTEUR), "Summary of [96#59][LTE/V2X] on Uu/SL prioritization", 3GPP TSG-RAN WG2 Meeting #97, R2-1701375, Athens, Greece, Feb. 13-17, 2017, 14 pages.

Samsung, "Coexistence of PC5-based V2V operation and legacy Uu operation", 3GPP TSGsg Ran WG1 #86bis, R1-1608993, Lisbon, Portugal, Oct. 10-14, 2016, 3 pages.

3GPP TS 38.212 V15.2.0 (Jun. 2018), 3rd Generation Partnership Project; Technical Specification Group Radio Access Network; NR; Multiplexing and channel coding (Release 15), 98 pages.

3GPP TS 38.321 V15.2.0 (Jun. 2018), 3rd Generation Partnership Project; Technical Specification Group Radio Access Network; NR; Medium Access Control (MAC) protocol specification (Release 15), 73 pages.

3GPP TS 38.331 V15.2.1 (Jun. 2018), 3rd Generation Partnership Project; Technical Specification Group Radio Access Network; NR; Radio Resource Control (RRC) protocol specification (Release 15), 303 pages.

* cited by examiner

DATA TRANSMISSION METHOD AND APPARATUS

CROSS-REFERENCE TO RELATED APPLICATIONS

This application is a continuation of International Application No. PCT/CN2019/106181, filed on Sep. 17, 2019, which claims priority to Chinese Patent Application No. 201811090216.6, filed on Sep. 18, 2018. The disclosures of the aforementioned applications are hereby incorporated by reference in their entireties.

TECHNICAL FIELD

This application relates to the communications field, and more specifically, to a data transmission method and apparatus.

BACKGROUND

Vehicle-to-everything (V2X) is considered as one of the most promising fields with clearest market requirements in the internet of things system. V2X features large application space, great industry potential, and strong social benefits, and is of great significance to promote the innovation and development of the automobile and information communication industry, build new models and new forms of automobile and transportation services, promote the innovation and application of autonomous driving technologies, and improve traffic efficiency and safety.

The 3GPP international organization for standardization has initiated research on V2X since LTE R14. In a V2X communications architecture, a communication link between V2X UEs is defined as a sidelink (SL), and a communication link between V2X UE and a base station is defined as an uplink (UL). In the prior art, if UE has both an available SL transmission opportunity and an available UL transmission opportunity, when the UE can transmit data on only one interface at the same time due to a limitation of a radio frequency capability of the UE, the UE may need to discard the SL transmission opportunity or the UL transmission opportunity. Consequently, reliability of SL data transmission or UL data transmission cannot be ensured.

SUMMARY

In view of this, this application provides a data transmission method and apparatus, to help improve data transmission reliability.

According to a first aspect, a data transmission method is provided, applied to a first terminal device. The first terminal device has first data to be transmitted on a sidelink and has second data to be transmitted on an uplink, and the method includes: When a sidelink transmission opportunity and an uplink transmission opportunity of the first terminal device overlap in time domain, the first terminal device compares a transmission priority of the first data with a transmission priority of the second data, and determines, based on a comparison result, whether there is a case in which the sidelink transmission opportunity is discarded, so as to determine whether to perform MAC PDU assembly on the first data. Specifically, the first terminal device compares the transmission priority of the first data with the transmission priority of the second data, and the first terminal device performs medium access control MAC protocol data unit PDU assembly on the first data or does not perform MAC PDU assembly on the first data based on the result of comparison between the transmission priority of the first data and the transmission priority of the second data. The sidelink is a direct wireless communication link between the first terminal device and a second terminal device, and the uplink is a wireless communication link between the first terminal device and a first radio access network device. In this way, packet assembly does not need to be first performed, thereby avoiding a case in which an assembled data packet is discarded due to a collision, and helping improve data transmission reliability.

In a possible implementation, that the first terminal device performs MAC PDU assembly on the first data or does not perform MAC PDU assembly on the first data based on the result of comparison between the transmission priority of the first data and the transmission priority of the second data includes: when the transmission priority of the first data is lower than or equal to the transmission priority of the second data, the first terminal device does not perform MAC PDU assembly on the first data; or when the transmission priority of the first data is higher than or equal to the transmission priority of the second data, the first terminal device performs MAC PDU assembly on the first data.

Optionally, in a possible case, if the transmission priority of the first data is lower than or equal to the transmission priority of the second data, the first terminal device does not perform MAC PDU assembly on the first data. If the transmission priority of the first data is higher than the transmission priority of the second data, the first terminal device performs MAC PDU assembly on the first data.

Optionally, in a possible case, if the transmission priority of the first data is lower than the transmission priority of the second data, the first terminal device does not perform MAC PDU assembly on the first data. If the transmission priority of the first data is higher than or equal to the transmission priority of the second data, the first terminal device performs MAC PDU assembly on the first data.

Optionally, the transmission priority of the first data and the transmission priority of the second data each correspond to any one of the following pieces of information: proSe per-packet reliability PPPR, a proSe per-packet priority PPPP, a 5G QoS identifier, and a QoS flow identifier QFI.

For example, when the transmission priority of the first data and the transmission priority of the second data are compared, the transmission priorities may be information of a same type. In other words, the transmission priority of the first data and the transmission priority of the second data correspond to information of a same type. This facilitates comparison.

Optionally, the first terminal device may alternatively determine, based on the following condition, that there is a case in which the sidelink transmission opportunity is discarded: the sidelink transmission opportunity of the first terminal device falls within a measurement gap.

When the sidelink transmission opportunity falls within the measurement gap, regardless of whether the first terminal device has the uplink transmission opportunity at the same time, the first terminal device may directly determine that the sidelink transmission opportunity needs to be discarded.

According to a second aspect, a data transmission method is provided. The method is applied to a first terminal device, the first terminal device has first data to be transmitted on a sidelink, and the method includes: The first terminal device selects a first transmission resource, and sends, on the sidelink by using the first transmission resource, a medium access control MAC protocol data unit PDU corresponding to the first data; and if the first terminal device fails to send the MAC PDU corresponding to the first data, the first terminal device sends, by using a second transmission resource, the MAC PDU corresponding to the first data. The sidelink is a direct wireless communication link between the first terminal device and a second terminal device. In this way, the first terminal device resends the MAC PDU of the first data on the second transmission resource, so that data transmission reliability can be improved.

The MAC PDU corresponding to the first data is a MAC PDU obtained by performing MAC PDU assembly on the first data. The MAC PDU may not include all to-be-transmitted data. For example, "corresponding" in "MAC PDU corresponding to the first data" may be explained as a case in which the first data is included in one MAC PDU, a case in which the first data is included in a plurality of MAC PDUs, or the like.

In a possible implementation, the first transmission resource is an $M^{th}$ group of transmission opportunities, the second transmission resource is an $(M+k)^{th}$ group of transmission opportunities, M is an integer, and k is an integer.

For example, if the MAC PDU corresponding to the first data fails to be sent, the first terminal device does not perform MAC PDU assembly for the $(M+k)^{th}$ group of transmission opportunities.

Therefore, the first terminal device may send, in the $(M+k)^{th}$ group of transmission opportunities, the MAC PDU corresponding to the first data, so that data transmission reliability can be improved.

In another possible implementation, the second transmission resource is a resource reselected by the first terminal device, and a size TBS of a data block that can be transmitted by using the second transmission resource is the same as a size of the MAC PDU corresponding to the first data.

For example, the second transmission resource may be reselected by the first terminal device. Therefore, a manner for determining the second transmission resource is relatively flexible.

Optionally, the method further includes: the first terminal device receives time information from a network device, where the time information is used to indicate a time period for sending, by the first terminal device, the MAC PDU corresponding to the first data.

For example, that the first terminal device sends, by using the second transmission resource, the MAC PDU corresponding to the first data includes: the first terminal device sends, in the time period by using the second transmission resource, the MAC PDU corresponding to the first data.

Therefore, the first terminal device may send the MAC PDU of the first data in the time period, to avoid a case in which a latency of another data packet is excessively high because a same MAC PDU is continuously sent. This can improve data transmission reliability.

In a possible implementation, the method further includes: the first terminal device receives, from the network device, a maximum quantity of transmission resources for sending the MAC PDU corresponding to the first data, where the maximum quantity of transmission resources is a maximum quantity of transmission resources to be used by the first terminal device to repeatedly send the MAC PDU corresponding to the first data.

For example, that the first terminal device sends, by using the second transmission resource, the MAC PDU corresponding to the first data includes: the first terminal device sends, based on the maximum quantity of transmission resources by using the second transmission resource, the MAC PDU corresponding to the first data.

Therefore, the first terminal device may send the MAC PDU of the first data based on the maximum quantity of transmission resources, to avoid a case in which a latency of another data packet is excessively high because a same MAC PDU is continuously sent. This can improve data transmission reliability.

In a possible implementation, the method further includes: the first terminal device sends first indication information to the second terminal device, where the first indication information carries one or more of the following pieces of information: an identifier of the first terminal device, an identifier of a hybrid automatic repeat request HARQ process to be used by the second terminal device to receive the MAC PDU corresponding to the first data, and a MAC PDU retransmission indication, and the retransmission indication is used to indicate whether the currently sent MAC PDU is the same as a previously sent MAC PDU.

Optionally, the first indication information may be carried in sidelink control information SCI, or may be sent by using other signaling. This is not limited.

Therefore, the first terminal device sends the first indication information to the second terminal device, so that the second terminal device determines, based on the first indication information, whether to decode data in a combination manner. This can increase a data decoding success rate.

According to a third aspect, a data transmission method is provided, applied to a second terminal device. The method includes: the second terminal device receives first indication information from a first terminal device on a sidelink, where the first indication information carries one or more of the following pieces of information: an identifier of the first terminal device, an identifier of a hybrid automatic repeat request HARQ process to be used by the second terminal device to receive a medium access control MAC protocol data unit PDU, and a MAC PDU retransmission indication, and the retransmission indication is used to indicate whether a currently sent MAC PDU is the same as a previously sent MAC PDU; the second terminal device receives, from the first terminal device on the sidelink, a MAC PDU corresponding to first data; and the second terminal device decodes, based on the first indication information, the MAC PDU corresponding to the first data, where the sidelink is a direct wireless communication link between the first terminal device and the second terminal device. Therefore, the second terminal device receives the first indication information, and determines, based on the first indication information, whether to decode data in a combination manner. This can increase a data decoding success rate.

The MAC PDU corresponding to the first data is a MAC PDU obtained by performing MAC PDU assembly on the first data. The MAC PDU may not include all to-be-transmitted data. For example, "corresponding" in "MAC PDU corresponding to the first data" may be explained as a case in which the first data is included in one MAC PDU, a case in which the first data is included in a plurality of MAC PDUs, or the like.

Optionally, the first indication information may be carried in sidelink control information SCI, or may be carried in other signaling. This is not limited.

Optionally, the retransmission indication is used to indicate that the currently sent PDU is the same as the previously sent PDU. For example, that the second terminal device decodes the currently received PDU based on the first indication information includes: the second terminal device combines a previously received MAC PDU and the currently received MAC PDU corresponding to the first data.

According to a fourth aspect, a data transmission method is provided. The method is applied to a first terminal device. For example, the first terminal device has first data to be transmitted on a sidelink, and the method includes: the first terminal device obtains a specified quantity of sending times of sending a medium access control MAC protocol data unit PDU corresponding to the first data; and the first terminal device sends the MAC PDU based on the specified quantity of sending times by using a third transmission resource, where for example, the third transmission resource is any transmission resource in periodic resources of the first terminal device, and the sidelink is a direct wireless communication link between the first terminal device and a second terminal device. Therefore, the first terminal device may specify the quantity of sending times on the periodic resource, to ensure transmission reliability of each data packet.

In a possible implementation, there is a correspondence between the specified quantity of sending times and a quality of service parameter. For example, that the first terminal device obtains the specified quantity of sending times of sending the MAC PDU corresponding to the first data includes: the first terminal device determines the specified quantity of sending times based on the correspondence and a quality of service parameter corresponding to the MAC PDU.

In a possible implementation, the method further includes: the first terminal device sends control information to the second terminal device, where the control information includes one or more of a new data indicator NDI, a redundancy version RV identifier, and a time-frequency resource indicator, and the time-frequency resource indicator is used to indicate a time-frequency resource location of the third transmission resource.

According to a fifth aspect, a data transmission method is provided. The method includes: a second terminal device receives control information from a first terminal device, where the control information includes one or more of a new data indicator NDI, a redundancy version RV identifier, and a time-frequency resource indicator, and the time-frequency resource indicator is used to indicate a time-frequency resource location of a third transmission resource; and the second terminal device receives, on the third transmission resource based on the control information, a MAC PDU corresponding to first data, and processes the MAC PDU based on the NDI and the RV identifier.

Therefore, the second terminal device may receive, on a periodic resource, the MAC PDU sent by the first terminal device, and perform decoding based on the control information.

According to a sixth aspect, a data transmission method is provided, applied to a first terminal device. For example, the first terminal device has first data to be transmitted on a sidelink and has second data to be transmitted on an uplink, and the method includes: the first terminal device obtains a maximum quantity of preemption times of sending a medium access control MAC protocol data unit PDU corresponding to the first data, where the maximum quantity of preemption times is a maximum quantity of times the first terminal device can preempt, when the first terminal device transmits the second data on the uplink, the first data transmitted on the sidelink; the first terminal device determines a transmission priority of the first data based on the maximum quantity of preemption times; and the first terminal device transmits, based on the transmission priority of the first data, the MAC PDU corresponding to the first data, where the sidelink is a direct wireless communication link between the first terminal device and a second terminal device, and the uplink is a wireless communication link between the first terminal device and a first radio access network device. Therefore, the first terminal device adjusts the transmission priority of the first data, to help improve data transmission reliability.

The MAC PDU corresponding to the first data is a MAC PDU obtained by performing MAC PDU assembly on the first data. The MAC PDU may not include all to-be-transmitted data. For example, "corresponding" in "MAC PDU corresponding to the first data" may be explained as a case in which the first data is included in one MAC PDU, a case in which the first data is included in a plurality of MAC PDUs, or the like.

In a possible implementation, that the first terminal device determines the transmission priority of the first data based on the maximum quantity of preemption times includes: the first terminal device adjusts the transmission priority of the first data when a quantity of times the uplink preempts the sidelink exceeds the maximum quantity of preemption times.

Optionally, the first terminal device may increase the transmission priority of the first data, to avoid a case in which the MAC PDU of the first data cannot be sent because the MAC PDU of the first data is discarded a plurality of times, so as to improve data transmission reliability.

In a possible implementation, there is an association relationship between the maximum quantity of preemption times and a quality of service parameter. For example, that the first terminal device obtains the maximum quantity of preemption times of sending the MAC PDU corresponding to the first data includes: the first terminal device determines the maximum quantity of preemption times based on the association relationship and a quality of service parameter corresponding to the MAC PDU corresponding to the first data.

Optionally, the quality of service parameter may be a parameter reflecting a quality of service requirement that a service needs to satisfy, such as any one of the following parameters: proSe per-packet reliability PPPR, a proSe per-packet priority PPPP, a 5QI, and a QFI.

According to a seventh aspect, a data transmission apparatus is provided. The apparatus includes a module configured to perform the method in the first aspect or the implementations of the first aspect, a module configured to perform the method in the second aspect or the implementations of the second aspect, a module configured to perform the method in the third aspect or the implementations of the third aspect, a module configured to perform the method in the fourth aspect or the implementations of the fourth aspect, a module configured to perform the method in the fifth aspect or the implementations of the fifth aspect, or a module configured to perform the method in the sixth aspect or the implementations of the sixth aspect.

Optionally, the apparatus is a V2X device, for example, a terminal device.

According to an eighth aspect, a communications apparatus is provided. The communications apparatus may be the terminal device in the foregoing method designs, or may be a chip disposed in the terminal device. The communications apparatus includes a processor. Optionally, the communications apparatus may further include a memory. The processor is coupled to the memory, and may be configured to execute an instruction in the memory, to implement the method performed by the terminal device (including the first terminal device or the second terminal device) in any one of the first aspect to the sixth aspect and the possible implementations of the first aspect to the sixth aspect. Optionally, the communications apparatus further includes a communications interface, and the processor is coupled to the communications interface.

When the communications apparatus is the terminal device, the communications interface may be a transceiver or an input/output interface.

When the communications apparatus is the chip disposed in the terminal device, the communications interface may be an input/output interface.

Optionally, the transceiver may be a transceiver circuit. Optionally, the input/output interface may be an input/output circuit.

According to a ninth aspect, a program is provided. When being executed by a processor, the program is used to perform the method provided in any one of the first aspect to the sixth aspect.

According to a tenth aspect, a program product is provided. The program product includes program code, and when the program code is run by a communications unit and a processing unit or a transceiver and a processor of a communications apparatus (for example, a first terminal device or a second terminal device), the communications apparatus is enabled to perform the method in any one of the first aspect to the sixth aspect and the possible implementations of the first aspect to the sixth aspect.

According to an eleventh aspect, a computer-readable medium is provided. The computer-readable medium stores a program, and the program enables a communications apparatus (for example, a first terminal device or a second terminal device) to perform the method in any one of the first aspect to the sixth aspect and the possible implementations of the first aspect to the sixth aspect.

According to a twelfth aspect, a system is provided. The system includes a first terminal device, and the first terminal device may be configured to perform the steps performed by the first terminal device in any possible implementation of the first aspect or the sixth aspect.

In a possible implementation, the system may further include another device (for example, a second terminal device or a network device) that interacts with the first terminal device and that is provided in the embodiments of this application.

According to a thirteenth aspect, a system is provided. The system includes a first terminal device, and the first terminal device may be configured to perform the steps performed by the first terminal device in the method in any one of the second aspect and the possible implementations of the second aspect.

In a possible implementation, the system may further include a second terminal device, and the second terminal device may be configured to perform the steps performed by the second terminal device in the method in any one of the third aspect and the possible implementations of the third aspect.

In a possible implementation, the system may further include another device (for example, a network device) that interacts with the first terminal device or the second terminal device and that is provided in the embodiments of this application.

According to a fourteenth aspect, a system is provided. The system includes a first terminal device, and the first terminal device may be configured to perform the steps performed by the first terminal device in the method in any one of the fourth aspect and the possible implementations of the fourth aspect.

In a possible implementation, the system may further include a second terminal device, and the second terminal device may be configured to perform the steps performed by the second terminal device in the method in any one of the fifth aspect and the possible implementations of the fifth aspect.

In a possible implementation, the system may further include another device (for example, a network device) that interacts with the first terminal device or the second terminal device and that is provided in the embodiments of this application.

According to a fifteenth aspect, a chip is provided. The chip may be used in a communications apparatus. The chip includes at least one processor, and when the at least one processor executes an instruction, the chip or the communications apparatus is enabled to perform the method in any possible implementation of any one of the foregoing aspects. The chip may further include a memory, and the memory may be configured to store the related instruction.

DETAILED DESCRIPTION OF ILLUSTRATIVE EMBODIMENTS

Figure 1:
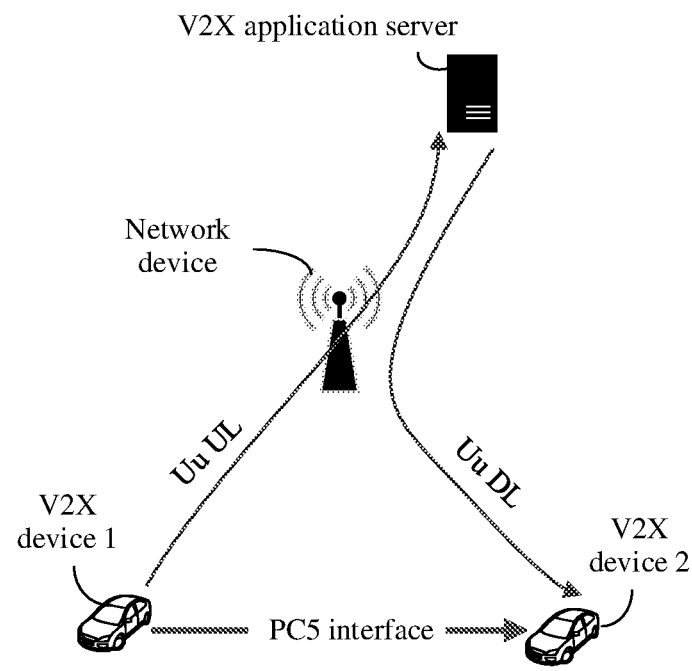
FIG. 1 is a diagram of a system architecture to which an embodiment of this application is applied.

The following describes technical solutions of this application with reference to the accompanying drawings.

In the descriptions of the embodiments of this application, unless otherwise stated, "a plurality" of means two or more than two.

The technical solutions in the embodiments of this application may be applied to various communications systems, such as a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a future 5th generation (5G) system or new radio (NR) system, and a vehicle-to-everything (V2X) system. Optionally, the V2X system may be specifically any one of the following systems: a vehicle-to-vehicle (V2V) system, a vehicle-to-pedestrian (V2P) system, a vehicle-to-infrastructure (V2I) system, and the like.

A terminal device in the embodiments of this application may be user equipment (UE), an access terminal, a subscriber unit, a subscriber station, a mobile station, a mobile console, a remote station, a remote terminal, a mobile device, a user terminal, a terminal, a wireless communications device, a user agent, a user apparatus, or the like. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved public land mobile network (PLMN), or the like. This is not limited in the embodiments of this application.

A network device in the embodiments of this application may be a device configured to communicate with the terminal device. The network device may be a base transceiver station (BTS) in a global system for mobile communications (GSM) or a code division multiple access (CDMA) system, may be a NodeB (NB) in a wideband code division multiple access (WCDMA) system, may be an evolved NodeB (eNB or eNodeB) in an LTE system, or may be a radio controller in a cloud radio access network (CRAN) scenario. Alternatively, the network device may be a relay node, an access point, a vehicle-mounted device, a wearable device, a network device in a future 5G network, a network device in a future evolved PLMN, or the like. This is not limited in the embodiments of this application.

In the embodiments of this application, the terminal device or the network device includes a hardware layer, an operating system layer running above the hardware layer, and an application layer running above the operating system layer. The hardware layer includes hardware such as a central processing unit (CPU), a memory management unit (MMU), and memory (also referred to as main memory). The operating system may be any one or more computer operating systems that implement service processing by using a process, for example, a Linux operating system, a Unix operating system, an Android operating system, an iOS operating system, or a Windows operating system. The application layer includes applications such as a browser, contacts, word processing software, and instant communications software. In addition, a specific structure of an execution body of a method provided in the embodiments of this application is not specifically limited in the embodiments of this application, provided that a program that records code for the method provided in the embodiments of this application can be run to perform communication according to the method provided in the embodiments of this application. For example, the execution body of the method provided in the embodiments of this application may be the terminal device, the network device, or a function module that is in the terminal device or the network device and that can invoke and execute the program.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to: a magnetic storage component (for example, a hard disk, a floppy disk, or a magnetic tape), an optical disc (for example, a compact disc (CD) or a digital versatile disc (DVD)), a smart card, and a flash memory component (for example, an erasable programmable read-only memory (EPROM), a card, a stick, or a key drive). In addition, various storage media described in this specification may represent one or more devices and/or other machine-readable media that are configured to store information. The term "machine-readable media" may include but is not limited to a radio channel, and various other media that can store, contain, and/or carry an instruction and/or data.

The embodiments of this application may be applied to an internet of things system, for example, a vehicle-to-everything (V2X) system. V2X refers to using in-vehicle sensors and vehicle-mounted terminals to provide vehicle information and using various communication technologies to implement mutual communication between vehicles, between vehicles and pedestrians, between vehicles and roadside infrastructure, and between vehicles and networks.

FIG. 1 is an example diagram of a system architecture to which an embodiment of this application is applied. As shown in FIG. 1, a communications system includes a V2X application server, V2X devices (including a V2X device 1 and a V2X device 2), and a network device. The V2X devices communicate with each other through a PC5 interface. A communication link between the V2X devices is defined as a sidelink (SL). Communication between the V2X device and the V2X application server requires forwarding by the network device. Specifically, for uplink, a transmit end V2X device sends V2X data to the network device through a Uu interface, the network device sends the data to the V2X application server for processing, and then the V2X application server delivers the data to a receive end V2X device. For downlink, the V2X application server sends V2X data to the network device, and the network device sends the V2X data to the V2X device through a Uu interface.

It should be understood that the V2X device in FIG. 1 is an internet of things device, for example, UE.

It should be further understood that an arrow direction in FIG. 1 is merely described by using the V2X device 1 as an example, and constitutes no limitation on this embodiment of this application. Actually, communication between the V2X device 1 and the V2X device 2 may be bidirectional, and the V2X device 2 may also perform uplink communication with the network device. This is not specifically limited.

Figure 2:
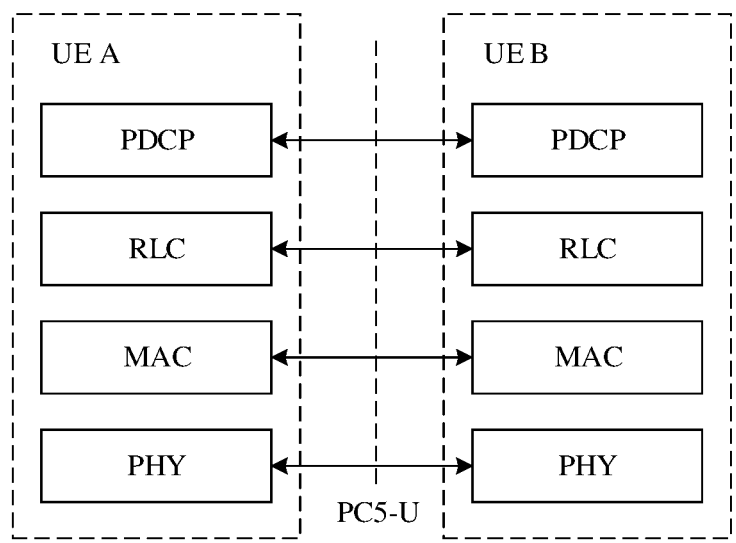
FIG. 2 is a schematic diagram of a communications protocol stack according to an embodiment of this application.

FIG. 2 shows a user plane communications protocol stack of a PC5 interface in LTE V2X. As shown in FIG. 2, communication between UE A and UE B is used as an example, and the UE A communicates with the UE B through the PC5 interface. The PC5 interface and an LTE Uu interface may have a same user plane protocol stack, including a packet data convergence protocol (PDCP) layer, a radio link control (RLC) layer, a medium access control (MAC) layer, and a physical layer (PHY). V2X UE does not support hybrid automatic repeat request (HARQ) feedback at the MAC layer. To be specific, communication is performed through blind retransmission, and a quantity of blind retransmission times may be 0 or 1.

The following describes concepts or terms in the embodiments of this application.

A collision between SL transmission and UL transmission is as follows: Due to a limitation of a radio frequency capability of UE, for example, when SL transmission and UL transmission need to be performed in a same subframe on a same carrier, but the UE can perform data transmission on only one interface due to a capability limitation, the UE needs to abandon an SL transmission opportunity or a UL transmission opportunity. This situation is referred to as a collision. Certainly, SL transmission and UL transmission may be simultaneously performed. However, when power of the UE is limited, the UE needs to reduce SL transmission power or UL transmission power. Optionally, a specific interface on which the UE abandons a transmission opportunity or a specific interface on which the UE reduces transmission power may be determined by comparing a priority of data to be transmitted on an SL interface with a priority of data to be transmitted on a UL interface.

To improve data transmission reliability, in the embodiments of this application, before medium access control MAC PDU assembly, a transmission priority of a sidelink is compared with a transmission priority of an uplink, and then whether to perform MAC protocol data unit PDU assembly is determined based on a transmission priority comparison result. For example, comparing transmission priorities specifically means comparing priorities of to-be-transmitted data. For example, when a transmission resource on a sidelink and a transmission resource on an uplink are available at a same moment, UE compares a highest priority of a MAC service data unit SDU that can be transmitted by using the transmission resource on the sidelink with a highest priority of a MAC SDU that can be transmitted by using the transmission resource on the uplink. The transmission resource on the sidelink may be referred to as a sidelink transmission opportunity, and the transmission resource on the uplink may be referred to as an uplink transmission opportunity.

Figure 3:
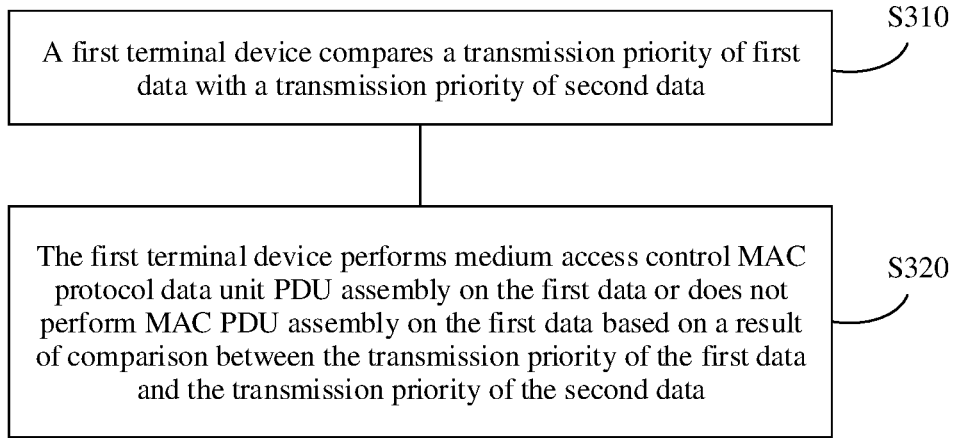
FIG. 3 is a schematic flowchart of a data transmission method according to an embodiment of this application.

FIG. 3 is a schematic flowchart of a data transmission method 300 according to an embodiment of this application. The method 300 is applied to a first terminal device. The first terminal device has first data to be transmitted on a sidelink and has second data to be transmitted on an uplink, and the first terminal device has both a sidelink transmission opportunity and an uplink transmission opportunity. As shown in FIG. 3, the method 300 includes the following steps.

S310: The first terminal device compares a transmission priority of the first data with a transmission priority of the second data.

Optionally, the transmission priority of the first data and the transmission priority of the second data may correspond to a quality of service (QoS) parameter. For example, in this embodiment of this application, the QoS parameter may be a parameter reflecting a quality of service requirement that a service needs to satisfy, and for example, may be any one of the following parameters: proSe per-packet reliability (PPPR), a proSe per-packet priority (PPPP), a 5G QoS identifier (5QI), a QoS flow identifier (QFI), and the like.

For example, the transmission priority may correspond to the proSe per-packet priority PPPP. A smaller PPPP value indicates a higher priority. For another example, the transmission priority may correspond to the proSe per-packet reliability PPPR.

In this embodiment of this application, the transmission priority of the first data and the transmission priority of the second data each correspond to any one of the following pieces of information: proSe per-packet reliability PPPR, a proSe per-packet priority PPPP, a 5th generation quality of service 5G QoS identifier, and a QoS flow identifier QFI.

For example, when the transmission priority of the first data and the transmission priority of the second data are compared, the transmission priorities may be information of a same type. For example, the transmission priority of the first data and the transmission priority of the second data correspond to information of a same type. This facilitates comparison. For example, the transmission priority of the first data corresponds to PPPR (or a PPPR value), and the transmission priority of the second data also corresponds to PPPR (or a PPPR value). The PPPR of the first data and the PPPR of the second data may be compared. For example, the transmission priority of the first data and the transmission priority of the second data each may be represented by the PPPR. For another example, the transmission priority of the first data corresponds to a PPPP (or a PPPP value), and the transmission priority of the second data also corresponds to a PPPP (or a PPPP value). The PPPP of the first data and the PPPP of the second data may be compared. For example, the transmission priority of the first data and the transmission priority of the second data each may be represented by the PPPP. For another example, the transmission priority of the first data corresponds to a 5G QoS identifier, and the transmission priority of the second data also corresponds to a 5G QoS identifier. The 5G QoS identifier of the first data and the 5G QoS identifier of the second data may be compared. For example, the transmission priority of the first data and the transmission priority of the second data each may be represented by the 5G QoS identifier. For another example, the transmission priority of the first data corresponds to a QFI, and the transmission priority of the second data also corresponds to a QFI. The QFI of the first data and the QFI of the second data may be compared. For example, the transmission priority of the first data and the transmission priority of the second data each may be represented by the QFI.

Optionally, S310 may be an optional step. For example, a result of comparison between the transmission priority of the first data and the transmission priority of the second data may be alternatively obtained from another source.

S320: The first terminal device performs medium access control MAC protocol data unit PDU assembly on the first data or does not perform MAC PDU assembly on the first data based on the result of comparison between the transmission priority of the first data and the transmission priority of the second data.

The sidelink is a direct wireless communication link between the first terminal device and a second terminal device, and the uplink is a wireless communication link between the first terminal device and a first radio access network device.

The first radio access network device may be understood as a network device, for example, the network device in FIG. 1. For example, the first terminal device may be the V2X device 1 in FIG. 1, and the second terminal device may be the V2X device 2 in FIG. 1. Alternatively, the first terminal device may be the V2X device 2 in FIG. 1, and the second terminal device may be the V2X device 1 in FIG. 1.

Optionally, S320 includes: when the transmission priority of the first data is lower than or equal to the transmission priority of the second data, the first terminal device does not perform MAC PDU assembly on the first data; or when the transmission priority of the first data is higher than or equal to the transmission priority of the second data, the first terminal device performs MAC PDU assembly on the first data.

For example, if the transmission priority of the first data is lower than or equal to the transmission priority of the second data, there is a case in which a sidelink transmission opportunity is discarded. In this case, the first terminal device does not perform MAC PDU assembly on the first data. Alternatively, if the transmission priority of the first data is higher than or equal to the transmission priority of the second data, there is no case in which a sidelink transmission opportunity is discarded. In this case, the first terminal device performs MAC PDU assembly on the first data. Specifically, a MAC layer entity of the first terminal device performs MAC PDU assembly on the first data.

Optionally, in a possible case, if the transmission priority of the first data is lower than or equal to the transmission priority of the second data, the first terminal device does not perform MAC PDU assembly on the first data. If the transmission priority of the first data is higher than the transmission priority of the second data, the first terminal device performs MAC PDU assembly on the first data.

Optionally, in a possible case, if the transmission priority of the first data is lower than the transmission priority of the second data, the first terminal device does not perform MAC PDU assembly on the first data. If the transmission priority of the first data is higher than or equal to the transmission priority of the second data, the first terminal device performs MAC PDU assembly on the first data.

In other words, when a new transmission resource on the sidelink arrives, before performing LCP packet assembly, the first terminal device needs to determine, with reference to the transmission priorities, whether a sidelink transmission opportunity is to be discarded due to a collision between uplink transmission and sidelink transmission. Based on the transmission priority comparison result, if the first terminal device determines that a current sidelink transmission opportunity is not to be discarded, the first terminal device performs MAC PDU assembly on the first data on the sidelink; or if the terminal device determines that a current sidelink transmission opportunity is to be discarded, the terminal device does not perform MAC PDU assembly on the first data on the sidelink.

In this embodiment of this application, sidelink transmission opportunities may include a new transmission opportunity and a retransmission opportunity. Optionally, that the sidelink transmission opportunity is discarded due to a collision may be any one of the following cases: the new transmission opportunity in the sidelink transmission opportunities is discarded due to a collision; the retransmission opportunity in the sidelink transmission opportunities is discarded due to a collision; and the new transmission opportunity and the retransmission opportunity in the sidelink transmission opportunities each are discarded due to a collision. Alternatively, there is another case: Sidelink transmission opportunities include an initial transmission opportunity and a plurality of retransmission opportunities, and that the sidelink transmission opportunity is discarded due to a collision may be: the initial transmission opportunity and/or any N retransmission opportunities in the sidelink transmission opportunities are/is discarded due to a collision. For example, N is an integer greater than 1. For example, the sidelink transmission opportunities include the initial transmission opportunity and four retransmission opportunities. If N=2, the first terminal device determines that the initial transmission opportunity and any two retransmission opportunities each encounter a collision. In this case, the first terminal device considers that the sidelink transmission opportunities are discarded due to a collision.

Optionally, N may be predefined in a protocol or configured by the network device by using system information or dedicated signaling. This is not limited. Alternatively, sidelink transmission opportunities include an initial transmission opportunity and a plurality of retransmission opportunities, and that the sidelink transmission opportunity is discarded due to a collision may be: any H transmission opportunities in the sidelink transmission opportunities are discarded due to a collision. H is an integer greater than 1. For example, H is a total quantity of transmission opportunities that may be discarded due to a collision. To be specific, all of the H transmission opportunities may be retransmission opportunities, namely, H retransmission opportunities, or the H transmission opportunities may be the initial transmission opportunity and H−1 retransmission opportunities. This is not limited. Optionally, H may be predefined in a protocol or configured by the network device by using system information or dedicated signaling. This is not limited.

It should be understood that, when there is a collision between the uplink and the sidelink, the data transmission method in this embodiment of this application is described by using an example in which the sidelink transmission opportunity is discarded. However, the data transmission method in this embodiment of this application may also be applied to a case in which an uplink transmission opportunity is discarded. This is not limited.

Optionally, the first terminal device may determine, based on one or more of the following conditions, that there is a case in which the sidelink transmission opportunity is discarded: sidelink transmission and uplink transmission of the first terminal device overlap in time domain; and the sidelink transmission opportunity of the first terminal device falls within a measurement gap.

Specifically, if the sidelink transmission and the uplink transmission overlap in time domain, and the first terminal device can perform transmission on only one interface, the first terminal device may choose to discard the sidelink transmission opportunity. For example, when the sidelink transmission and the uplink transmission overlap in time domain, the first terminal device needs to determine, with reference to the foregoing transmission priority comparison result, whether to discard the sidelink transmission opportunity.

[ono] Alternatively, if the sidelink transmission opportunity of the first terminal device falls within the measurement gap, the first terminal device cannot perform sidelink transmission, and therefore, discards the sidelink transmission opportunity. For example, the measurement gap is configured by the network device for the first terminal device and is used to measure a signal quality of an inter-frequency cell. For example, when the sidelink transmission opportunity falls within the measurement gap, regardless of whether there is an uplink transmission opportunity at the same time, the first terminal device may directly determine that the sidelink transmission opportunity needs to be discarded.

Optionally, with respect to "if the first terminal device determines that a current sidelink transmission opportunity is to be discarded, the terminal device does not perform MAC PDU assembly on the first data", if a resource (for example, a grant resource) of the sidelink transmission opportunity is a one-shot transmission resource selected by the first terminal device in a mode 4, the first terminal device is triggered to reselect a one-shot transmission resource; or if a resource of the sidelink transmission opportunity is a resource reservation transmission resource selected by the first terminal device in the mode 4, the first terminal device is triggered to reselect a one-shot transmission resource, or the first terminal device is triggered to perform resource reselection for resource reservation transmission. The one-shot transmission resource is a resource selected by the first terminal device to transmit one MAC PDU. The resource reservation transmission resource is a periodic transmission resource that is selected by the first terminal device and that is valid in a period of time, and may be used to transmit a plurality of MAC PDUs. For example, the mode 4 is a mode in which a terminal device needs to autonomously select a transmission resource from a resource pool. A network device may configure a resource pool for SL transmission of the terminal device.

In a possible case, during logical channel prioritization (LCP) packet assembly, the first terminal device determines that no collision occurs. However, during actual sending, a collision occurs, and then the sidelink transmission opportunity is discarded. For example, after performing LCP packet assembly for the sidelink transmission opportunity, the first terminal device receives a DCI indication from the network device, where uplink transmission indicated by the DCI overlaps sidelink transmission. In this case, if the first terminal device determines to discard the sidelink transmission opportunity, the first terminal device may not update a redundancy version (RV) for the discarded sidelink transmission opportunity. In this case, the first terminal device may use sidelink control information (SCI) to carry RV indication information. In this way, a receiving-side terminal device (the second terminal device) decodes received data based on the RV indication information carried in the SCI. It should be understood that LCP packet assembly and MAC PDU assembly may be understood as a same concept, and may be replaced with each other. This is not limited.

This application further provides a data transmission method. When a sidelink transmission resource arrives, a first terminal device needs to determine whether a collision occurs in a previous group of sidelink transmission opportunities, and determine whether to continue to transmit a previous MAC PDU by using a current group of transmission opportunities.

Figure 4:
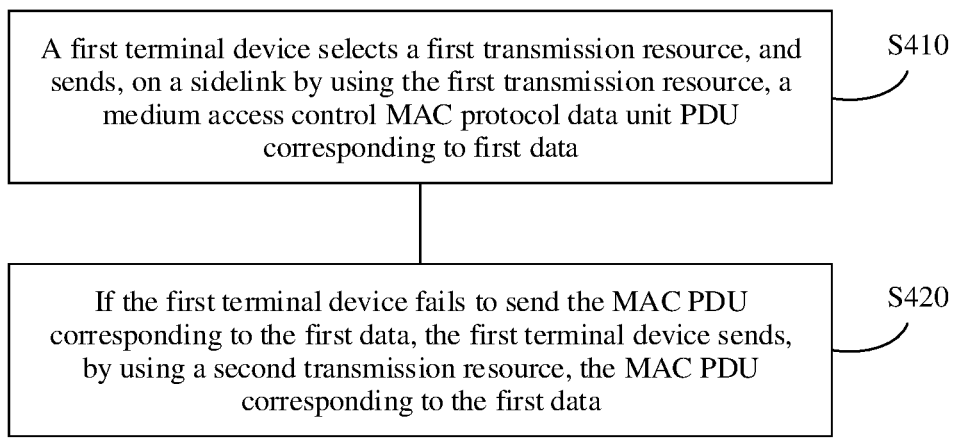
FIG. 4 is a schematic flowchart of a data transmission method according to another embodiment of this application.

FIG. 4 is a schematic flowchart of a data transmission method 400 according to another embodiment of this application. The method 400 is applied to a first terminal device. For example, the first terminal device has first data to be transmitted on a sidelink. The method 400 includes the following steps.

S410: The first terminal device selects a first transmission resource, and sends, on the sidelink by using the first transmission resource, a medium access control MAC protocol data unit PDU corresponding to the first data.

The MAC PDU corresponding to the first data is a MAC PDU obtained by performing MAC PDU assembly on the first data. The MAC PDU may not include all to-be-transmitted data. For example, "corresponding" in "MAC PDU corresponding to the first data" may be explained as a case in which the first data is included in one MAC PDU, a case in which the first data is included in a plurality of MAC PDUs, or the like.

For example, the first transmission resource may be a time-frequency resource selected by the first terminal device. For example, if the first terminal device determines that a quantity of blind retransmission times is 0, the first transmission resource is a time-frequency resource selected from a resource pool for one time of transmission. If the first terminal device determines that a quantity of blind retransmission times is 1, the first transmission resource is time-frequency resources selected from a resource pool for two times of transmission, and the time-frequency resources are separately used for initial transmission and retransmission.

S420: If the first terminal device fails to send the MAC PDU corresponding to the first data, the first terminal device sends, by using a second transmission resource, the MAC PDU corresponding to the first data.

The sidelink is a direct wireless communication link between the first terminal device and a second terminal device.

For example, that the first terminal device fails to send the MAC PDU corresponding to the first data may be understood as that transmission opportunity discarding occurs on the first transmission resource. In other words, if transmission opportunity discarding occurs on the first transmission resource, the second transmission resource is used to continue to send the MAC PDU corresponding to the first data, to improve data transmission reliability.

In a possible implementation, optionally, the first transmission resource is an $M^{th}$ group of transmission opportunities, the second transmission resource is an $(M+k)^{th}$ group of transmission opportunities, and M and k are integers. For example, when determining that a sidelink transmission opportunity in the $M^{th}$ group of transmission opportunities is discarded, the first terminal device does not perform a packet assembly operation for the $(M+k)^{th}$ group of transmission opportunities. To be specific, for the $(M+k)^{th}$ group of transmission opportunities, a MAC entity of the first terminal device does not perform an LCP process to assemble a new MAC PDU, but the first terminal device uses the second transmission resource to send a protocol data unit PDU transmitted or to be transmitted in the $M^{th}$ group of transmission opportunities.

Figure 5:
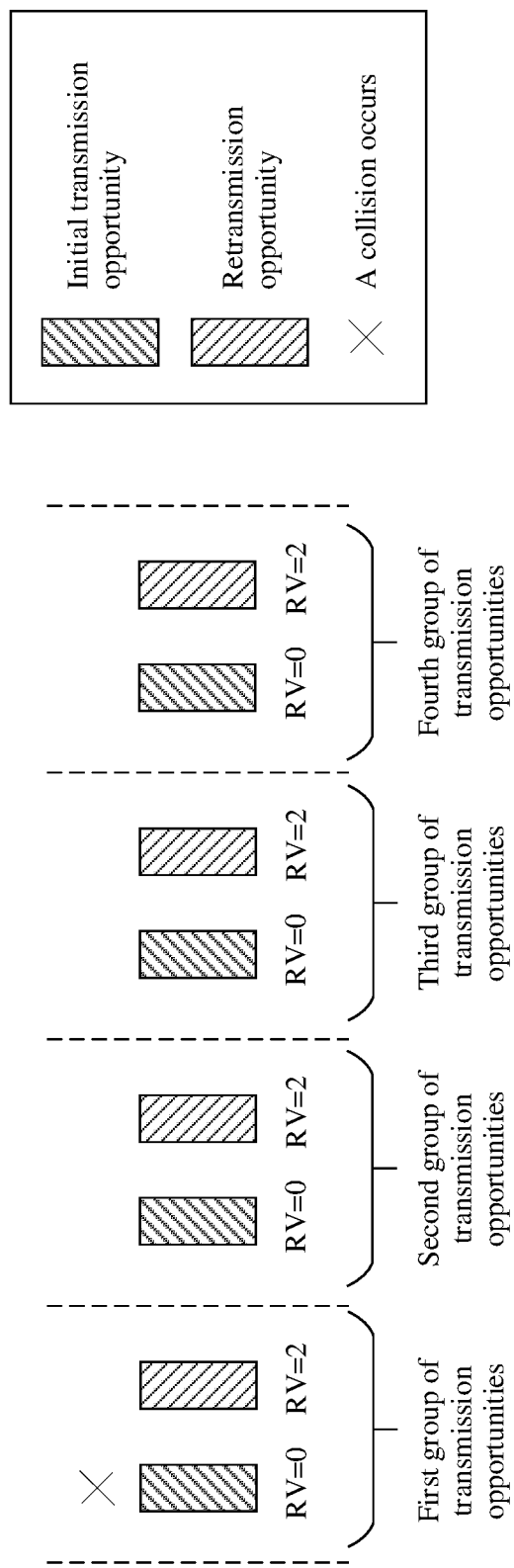
FIG. 5 is a schematic diagram of an example according to another embodiment of this application.

For example, the $M^{th}$ group of transmission opportunities includes an initial transmission opportunity and a retransmission opportunity. If the sidelink transmission opportunity in the $M^{th}$ group of retransmission opportunities is discarded, the first terminal device does not perform packet assembly, but may continue to transmit, by using the $(M+k)^{th}$ group of transmission opportunities, the MAC PDU corresponding to the first data. For example, as shown in FIG. 5, four groups of transmission opportunities are used as an example. If each group of transmission opportunities includes an initial transmission opportunity and one retransmission opportunity, and a collision occurs in an initial transmission opportunity in the first group of transmission opportunities, the first terminal device continues to transmit a MAC PDU in the first group of transmission opportunities by using the second group of transmission opportunities, that is, send the MAC PDU in an initial transmission opportunity in the second group of transmission opportunities based on RV=0, and send the MAC PDU in a retransmission opportunity in the second group of transmission opportunities based on RV=2. It should be understood that RV=2 herein is merely an example, and the first terminal device is not limited to sending the MAC PDU in the retransmission opportunity in the second group of transmission opportunities based on RV=2. For example, the first terminal device may alternatively send the MAC PDU in the retransmission opportunity in the second group of transmission opportunities based on RV=3. Optionally, RVs used by the first terminal device in the initial transmission opportunity and the retransmission opportunity are predefined in a protocol, or configured or preconfigured by a network device. Optionally, when transmitting the PDU in the $M^{th}$ group of transmission opportunities by using the $(M+k)^{th}$ group of transmission opportunities, the first terminal device may use a modulation and coding scheme (modulation and coding scheme, MCS) that is the same as that used in the $M^{th}$ group of transmission opportunities, and/or may use transmit power that is the same as or different from that used in the $M^{th}$ group of transmission opportunities. This is not limited. It should be understood that, the example in FIG. 5 is merely for ease of understanding of the embodiments of this application by a person skilled in the art, but is not intended to limit the embodiments of this application to a specific scenario in the example. A person skilled in the art can definitely make various equivalent modifications or changes according to the example in FIG. 5, and such modifications or changes also fall within the scope of the embodiments of this application.

In another possible implementation, optionally, the second transmission resource is a resource reselected by the first terminal device, and a size (for example, a transport block size (TBS)) of data that can be transmitted by using the second transmission resource is the same as a size of data transmitted by using the first transmission resource. For example, a resource block size corresponding to the second transmission resource is the same as that corresponding to the first transmission resource, and the first terminal device transmits data on the first transmission resource and the second transmission resource by using a same MCS. Alternatively, a resource block size corresponding to the second transmission resource is different from that corresponding to the first transmission resource, but the first terminal device adjusts an MCS, so that a size of data transmitted on the second transmission resource is the same as the size of the data transmitted on the first transmission resource. For example, if the first transmission resource is the $M^{th}$ group of transmission opportunities, the second transmission resource is a resource that is reselected by the first terminal device and that has a same size as a resource block corresponding to the $M^{th}$ group of transmission opportunities. For example, after the $M^{th}$ group of transmission opportunities ends, the first terminal device determines whether the MAC PDU transmitted in the $M^{th}$ group of transmission opportunities encounters a collision and a transmission opportunity is discarded. If an initial transmission opportunity and/or a retransmission opportunity of the MAC PDU transmitted in the $M^{th}$ group of transmission opportunities are/is discarded, the first terminal device is triggered to reselect a one-shot transmission resource, where a size of the selected resource block is the same as a size of a transmission resource block in this group of transmission opportunities; and the first terminal device transmits the MAC PDU on the selected one-shot transmission resource by using a same MCS. For example, the selected one-shot transmission resource includes an initial transmission opportunity and one retransmission opportunity. That the first terminal device continues to transmit the previous MAC PDU by using the one-shot transmission resource means that the MAC PDU is sent in the initial transmission opportunity based on RV=0, and the MAC PDU is sent in the retransmission opportunity based on RV=2. It should be understood that the RV used by the first terminal device herein is merely an example, and specific RV versions used by the terminal device in a new transmission opportunity and the retransmission opportunity are predefined in a protocol, or configured or preconfigured by a network device. In this solution, when a next group of transmission opportunities (namely, the $(M+k)^{th}$ group of transmission opportunities) of a periodic resource arrives, the terminal device performs LCP packet assembly to obtain a new packet.

In this embodiment of this application, whether a sidelink transmission opportunity in the $M^{th}$ group of transmission opportunities is discarded may be any one of the following cases: If the $M^{th}$ group of transmission opportunities includes an initial transmission opportunity and a retransmission opportunity, the initial transmission opportunity and/or the retransmission opportunity may be discarded; and if the $M^{th}$ group of transmission opportunities includes an initial transmission opportunity and a plurality of retransmission opportunities, the initial transmission opportunity and/or any N (N is an integer greater than 1) retransmission opportunities may be discarded, or any N transmission opportunities may be discarded. Optionally, N is predefined in a protocol or configured by the network device by using system information or dedicated signaling. This is not limited.

To avoid a case that a latency of another data packet is excessively high because the first terminal device sends a same MAC PDU by using a plurality of groups of transmission opportunities, a time period or a maximum quantity of transmission groups is introduced in this embodiment of this application to resolve this problem. Details are described below.

The first terminal device receives time information from the network device, where the time information is used to indicate a time period for sending, by the first terminal device, the MAC PDU corresponding to the first data.

For example, that the first terminal device sends, by using the second transmission resource, the MAC PDU corresponding to the first data includes: the first terminal device sends, in the time period by using the second transmission resource, the MAC PDU corresponding to the first data.

The MAC PDU corresponding to the first data is a MAC PDU obtained by performing MAC PDU assembly on the first data. The MAC PDU may not include all to-be-transmitted data. For example, "corresponding" in "MAC PDU corresponding to the first data" may be explained as a case in which the first data is included in one MAC PDU, a case in which the first data is included in a plurality of MAC PDUs, or the like.

Optionally, the time period may be implemented by using a timer, for example, an allowed retransmission timer allowedRetxTimer. Optionally, timing duration of the allowedRetxTimer timer may be configured per UE/MAC entity, that is, different HARQ processes maintain respective allowedRetxTimer timers, but the timers have same timing duration. The allowedRetxTimer timer may be alternatively configured per HARQ process, that is, different HARQ processes maintain respective allowedRetxTimer timers, and the timers may have different timing duration.

Use of the allowedRetxTimer timer is described herein. For example, when the allowedRetxTimer timer expires or is not started, and a new transmission resource for sidelink transmission arrives, the first terminal device performs an LCP process to assemble a new packet. When the allowedRetxTimer timer is running, and a new transmission resource for sidelink transmission arrives, if the first terminal device determines that a sidelink transmission opportunity is discarded in the first transmission resource (for example, the $M^{th}$ group of transmission opportunities), the first terminal device transmits the previous MAC PDU by using the second transmission resource. When the allowedRetxTimer timer is running, and a new transmission resource for sidelink transmission arrives, if the first terminal device determines that no sidelink transmission opportunity is discarded in the first transmission resource, the first terminal device still performs an LCP process to assemble a new packet. When the first terminal device performs LCP packet assembly to obtain a new packet, the allowedRetxTimer timer is started or restarted.

Optionally, the method further includes: the first terminal device receives, from the network device, a maximum quantity of transmission resources for sending the MAC PDU corresponding to the first data, where the maximum quantity of transmission resources is a maximum quantity of transmission resources to be used by the first terminal device to repeatedly send the MAC PDU corresponding to the first data.

For example, that the first terminal device sends, by using the second transmission resource, the MAC PDU corresponding to the first data includes: the first terminal device sends, based on the maximum quantity of transmission resources by using the second transmission resource, the MAC PDU corresponding to the first data.

The maximum quantity of transmission resources is a maximum quantity of transmission resources to be used by the first terminal device to repeatedly send a same MAC PDU. For example, an example in which the maximum quantity of transmission resources is a quantity of allowed retransmission times allowedRetxTimes is used for description. When a new transmission resource for sidelink transmission arrives, and the first terminal device has not processed a MAC PDU by using a current HARQ process, after performing LCP packet assembly to obtain a new MAC PDU, the first terminal device initializes a variable retxTimes to 0. The variable retxTimes is used to represent a quantity of times a current MAC PDU uses SL transmission opportunities. When a new SL transmission opportunity arrives, if a variable retxTimes corresponding to a previously transmitted MAC PDU is less than allowedRetxTimes, and the first terminal device determines that a sidelink transmission opportunity in the $M^{th}$ group of transmission opportunities is discarded, the first terminal device transmits the previous MAC PDU by using an $(M+1)^{th}$ group of transmission opportunities, and updates the variable retxTimes (a value is increased by 1). When a new SL transmission opportunity arrives, if a variable retxTimes corresponding to a previously transmitted MAC PDU is greater than or equal to allowedRetxTimes, or the first terminal device determines that no sidelink transmission opportunity in the $M^{th}$ group of transmission opportunities is discarded, after performing LCP packet assembly to obtain a new MAC PDU, the first terminal device initializes the variable retxTimes to 0.

In this embodiment of this application, optionally, the second terminal device (the second terminal device communicates with the first terminal device, and may be configured to receive data sent by the first terminal device) parses and processes a PDU received in each group of transmission opportunities. When a MAC PDU transmitted in the $M^{th}$ group of transmission opportunities and a MAC PDU transmitted in the $(M+k)^{th}$ group of transmission opportunities are a same MAC PDU, the second terminal device successfully parses both MAC PDUs, and the second terminal device sends both of the successfully parsed MAC PDUs to an upper layer for processing. A repetition detection function of the upper layer is used to prevent a repeated data packet from being sent to an application layer. In other words, the second terminal device does not distinguish whether the MAC PDU transmitted in the $M^{th}$ group of transmission opportunities is the same as the MAC PDU transmitted in the $(M+k)^{th}$ group of transmission opportunities.

Alternatively, optionally, the second terminal device may combine same MAC PDUs. Optionally, the method further includes: the first terminal device sends first indication information to the second terminal device, where the first indication information carries one or more of the following pieces of information: an identifier of the first terminal device, an identifier of a HARQ process to be used by the second terminal device to receive the MAC PDU corresponding to the first data, and a MAC PDU retransmission indication, and the retransmission indication is used to indicate whether the currently sent MAC PDU is the same as a previously sent MAC PDU. In other words, the first indication information may carry any one or more of these pieces of information. A quantity of items of the carried information is not specifically limited in this embodiment of this application. For example, the first indication information carries the identifier of the first terminal device, the identifier of the hybrid automatic repeat request HARQ process to be used by the second terminal device to receive the MAC PDU corresponding to the first data, and the MAC PDU retransmission indication.

Correspondingly, the second terminal device receives the first indication information. The second terminal device decodes a received PDU based on the first indication information.

Optionally, the first indication information may be sidelink control information SCI.

Optionally, the MAC PDU retransmission indication may be represented by using one bit. For example, if a value is 1, it indicates that a MAC PDU transmitted in a current group of transmission opportunities is the same as a MAC PDU transmitted in a previous group of transmission opportunities. If a value is 0, it indicates that a MAC PDU transmitted in a current group of transmission opportunities is different from a MAC PDU transmitted in a previous group of transmission opportunities.

For example, after receiving the SCI, the second terminal device may determine, based on the PDU transmission indication carried in the SCI, that the current MAC PDU is the same as the previously transmitted MAC PDU. In this case, the second terminal device determines, based on a UE identifier and a HARQ process identifier, whether data previously processed by a corresponding HARQ process is from UE indicated by the UE identifier. If the data previously processed by the corresponding HARQ process is from the UE indicated by the UE identifier, the corresponding HARQ process of the second terminal device performs soft combination on received data and the previously processed data, and attempts to perform decoding. In this way, a decoding success rate is increased.

It should be understood that an embodiment about the first indication information may be independently implemented, or may be implemented in combination with this embodiment of this application. This is not limited.

This application further provides an embodiment. An initial transmission opportunity and a retransmission opportunity in transmission opportunities are not distinguished. A terminal device may perform initial transmission or retransmission in all transmission opportunities. The terminal device performs sending by obtaining a specified quantity of sending times of sending a MAC PDU. The following describes this method in detail by using a first terminal device as an example. The method is applied to the first terminal device. For example, the first terminal device has first data to be transmitted on a sidelink. The method includes: the first terminal device obtains a specified quantity of sending times of sending a medium access control MAC protocol data unit PDU corresponding to the first data; and the first terminal device sends the MAC PDU based on the specified quantity of sending times by using a third transmission resource, where the third transmission resource may be any transmission resource in periodic resources of the first terminal device.

The sidelink is a direct wireless communication link between the first terminal device and a second terminal device.

The MAC PDU corresponding to the first data is a MAC PDU obtained by performing MAC PDU assembly on the first data. The MAC PDU may not include all to-be-transmitted data. For example, "corresponding" in "MAC PDU corresponding to the first data" may be explained as a case in which the first data is included in one MAC PDU, a case in which the first data is included in a plurality of MAC PDUs, or the like.

The periodic resource of the first terminal device may be a resource in a mode (mode) 3 or a resource in a mode 4. To be specific, the periodic resource of the first terminal device may be a resource allocated by a network device to the first terminal device in the mode 3, and an SPS resource is configured. Alternatively, the periodic resource of the first terminal device may be a periodically available transmission resource selected by the first terminal device in the mode 4. For detailed descriptions of the mode 3 and the mode 4, refer to descriptions in the prior art. Details are not described herein.

For example, an objective of introducing the third transmission resource is as follows: In this embodiment of this application, the first terminal device does not need to distinguish between an initial transmission opportunity and a retransmission opportunity, and may perform new transmission or retransmission in any transmission opportunity. In other words, herein, it does not need to be limited to a case that an initial transmission opportunity is necessarily followed by a retransmission opportunity, but it needs only to be ensured that the first terminal device completes sending the PDU on the periodic resource based on the specified quantity of sending times. A specific resource on which transmission is performed is not specifically limited. The second terminal device may learn, based on a new data indicator (new data indicator, NDI), whether the PDU is newly transmitted or retransmitted. In other words, the first terminal device specifies the quantity of sending times for the MAC PDU, so that transmission reliability of each data packet can be ensured.

Optionally, the specified quantity of sending times may be predefined in a protocol or configured by the network device by using system information or RRC dedicated signaling.

Optionally, the specified quantity of sending times may be separately configured for each terminal device. To be specific, one terminal device corresponds to one specified quantity of sending times, and all MAC PDUs transmitted by the terminal device by using periodic resources need to be transmitted the specified quantity of sending times.

Optionally, there is a correspondence between the specified quantity of sending times and a quality of service parameter. For example, that the first terminal device obtains the specified quantity of sending times of sending the PDU includes: the first terminal device determines the specified quantity of sending times based on the correspondence and a quality of service parameter corresponding to the MAC PDU.

Optionally, the correspondence may be predefined in a protocol or configured by the network device by using system information or RRC dedicated signaling.

Optionally, in this embodiment of this application, the QoS parameter is a parameter reflecting a quality of service requirement that a service needs to satisfy, and for example, may be any one of the following parameters: proSe per-packet reliability PPPR, a proSe per-packet priority PPPP, a 5QI, a QFI, and the like.

Optionally, for example, the QoS parameter is the PPPR, and the specified quantity of sending times is requiredRetxTimes. For example, PPPR=a corresponds to requiredRetxTimes=a', and PPPR=b corresponds to requiredRetxTimes=b'. When a smallest value of PPPR (a smaller PPPR value indicates a higher corresponding reliability requirement) corresponding to a data packet included in a MAC PDU is a, it is determined that the MAC PDU needs to be actually transmitted a' times.

Figure 6:
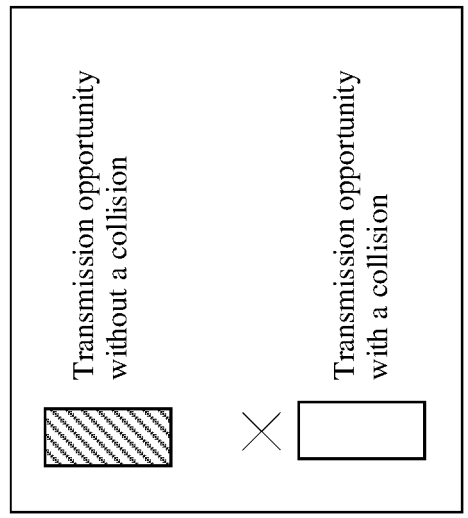
FIG. 6 is a schematic diagram of an example according to an embodiment of this application.
Figure 6:
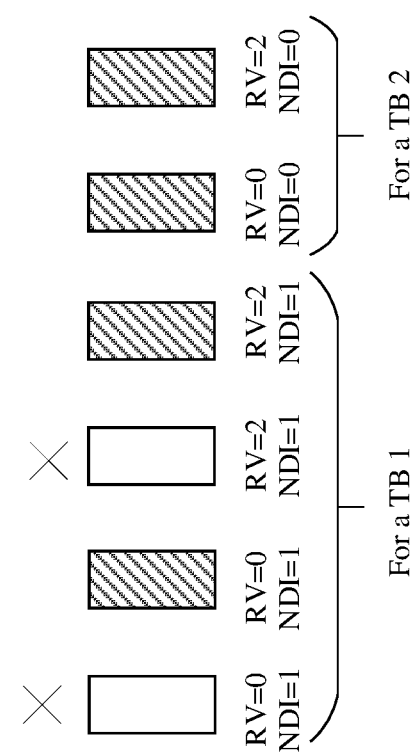

After performing LCP packet assembly, the first terminal device determines a quantity of actual transmission times requiredRetxTimes for an assembled MAC PDU, and initializes variables retxTimes and RV to 0. The variable retxTimes represents a quantity of times the MAC PDU has been actually transmitted through a PHY. When a transmission resource arrives, and a variable retxTimes corresponding to a previously transmitted MAC PDU is less than requiredRetxTimes, the first terminal device does not perform LCP packet assembly. If the first terminal device determines not to discard a current transmission opportunity, the first terminal device indicates a PHY entity to transmit the previous MAC PDU based on a current RV version, and updates variables retxTimes and RV. For example, updating retxTimes each time means increasing by 1, and updating RV means performing update based on a specific sequence, for example, performing cyclic update based on a sequence such as 0, 2, 3, 1 or 0, 3, 0, 3. If the first terminal device determines to discard a current transmission opportunity, the first terminal device does not indicate a PHY to perform transmission, and keeps current variables retxTimes and RV unchanged. When a transmission resource arrives, and a variable retxTimes corresponding to a previously transmitted MAC PDU is equal to requiredRetxTimes, the first terminal device performs LCP packet assembly, and initializes variables retxTimes and RV to 0. FIG. 6 is a schematic diagram of an example according to an embodiment of this application. FIG. 6 provides descriptions by using an example in which a value of requiredRetxTimes is 2, that is, each MAC PDU actually needs to be transmitted twice. An example in which the first terminal device performs transmission in a sequence of RV=0, 2, 3, 1 is used for description. The RV may be configured by the network device or predefined in a protocol. For example, because the value of requiredRetxTimes is 2, in this example, the first terminal device transmits a MAC PDU based on only RV=0, 2. For example, the first terminal device initializes variables retxTimes and RV to 0. When the first transmission opportunity arrives, the first terminal device performs new transmission on a TB 1 based on RV=0, where NDI=1. Because a collision occurs in the first transmission opportunity, both of the variables retxTimes and RV are not updated. When the second transmission opportunity arrives, the first terminal device still transmits the TB 1 based on RV=0. Because the transmission succeeds, the first terminal device updates retxTimes to 1 and updates RV to 2. When the third transmission opportunity arrives, the first terminal device transmits the TB 1 based on RV=2. Because a collision occurs in the third transmission opportunity, both of the variables retxTimes and RV are not updated. When the fourth transmission opportunity arrives, the first terminal device still transmits the TB 1 based on RV=2. Because the transmission succeeds, the first terminal device updates retxTimes to 2. In this case, the TB 1 has satisfied a required quantity 2 of transmission times requiredRetxTimes. Then, when the fifth transmission opportunity arrives, the first terminal device performs LCP packet assembly to obtain a new packet, transmits a TB 2, and initializes the variables retxTimes and RV to 0, and the NDI is changed to 0. Because the transmission succeeds, the first terminal device updates retxTimes to 1 and updates RV to 2. When the sixth transmission opportunity arrives, the first terminal device transmits the TB 2 based on RV=2. In the fifth transmission opportunity and the sixth transmission opportunity, the first terminal device performs new transmission and retransmission on the TB 2. It should be understood that, the example in FIG. 6 is merely for ease of understanding the embodiments of this application by a person skilled in the art, but is not intended to limit the embodiments of this application to a specific scenario in the example. A person skilled in the art can definitely make various equivalent modifications or changes according to the example in FIG. 6, and such modifications or changes also fall within the scope of the embodiments of this application.

Optionally, the method further includes: the first terminal device sends control information to the second terminal device, where the control information includes one or more of the following pieces of information: a new data indicator NDI, a redundancy version RV identifier, a periodic resource indicator, and a time-frequency resource indicator, the periodic resource indicator field indicates that a periodic resource is used for current transmission, and the time-frequency resource indicator is used to indicate a time-frequency resource location of the transmission resource. Correspondingly, the second terminal device receives the control information.

Optionally, the control information is sidelink control information SCI.

For example, after receiving the control information, the second terminal device identifies a time-frequency resource location of the periodic resource based on the periodic resource indicator field and a time-frequency resource location field, and receives, at the identified time domain location, the SCI and PSSCH data sent by the first terminal device. The second terminal device processes, by using a same HARQ process, data received on the periodic resource. Further, the second terminal device determines, based on an NDI parameter and an RV parameter, whether currently received data is newly transmitted or retransmitted relative to previously received data, so as to determine whether to directly perform decoding or perform decoding after combining the data with data in a soft combination buffer.

Optionally, in this embodiment of this application, the network device may also configure an allowed retransmission timer allowedRetxTimer for the first terminal device. When the first terminal device performs LCP packet assembly to obtain a new packet, the allowedRetxTimer timer is started or restarted. During running of the allowedRetxTimer timer, the first terminal device may retransmit the MAC PDU by using the periodic transmission resource. If the allowedRetxTimer timer expires, when the periodic transmission resource arrives, the first terminal device needs to perform LCP packet assembly to obtain a new packet and send the new packet.

This application further provides an embodiment. A priority of sidelink transmission is increased, to prevent the sidelink transmission from being discarded a plurality of times. A data transmission method in this embodiment of this application is applied to a first terminal device. For example, the first terminal device has first data to be transmitted on a sidelink and has second data to be transmitted on an uplink, and the method includes: the first terminal device obtains a maximum quantity of preemption times of sending a medium access control MAC protocol data unit PDU corresponding to the first data, where the maximum quantity of preemption times is a maximum quantity of times the first terminal device can preempt, when the first terminal device transmits the second data on the uplink, the first data transmitted on the sidelink; the first terminal device determines a transmission priority of the first data based on the maximum quantity of preemption times; and the first terminal device transmits, based on the transmission priority of the first data, the MAC PDU corresponding to the first data.

The sidelink is a direct wireless communication link between the first terminal device and a second terminal device, and the uplink is a wireless communication link between the first terminal device and a first radio access network device.

The MAC PDU corresponding to the first data is a MAC PDU obtained by performing MAC PDU assembly on the first data. The MAC PDU may not include all to-be-transmitted data. For example, "corresponding" in "MAC PDU corresponding to the first data" may be explained as a case in which the first data is included in one MAC PDU, a case in which the first data is included in a plurality of MAC PDUs, or the like.

Optionally, the maximum quantity of preemption times may be predefined in a protocol or configured by a network device by using system information or RRC dedicated signaling. This is not limited.

Optionally, the maximum quantity of preemption times may be configured for each terminal device. To be specific, one terminal device uses one maximum quantity of preemption times, and all MAC PDUs in sidelink transmission correspond to a same maximum quantity of preemption times.

Optionally, there is an association relationship between a maximum quantity of preemption times and a quality of service QoS parameter. For example, that the first terminal device obtains the maximum quantity of preemption times of sending the MAC PDU corresponding to the first data includes: the first terminal device determines the maximum quantity of preemption times based on the association relationship and a quality of service parameter corresponding to the MAC PDU corresponding to the first data.

Optionally, the association relationship may be predefined in a protocol, or may be configured by the network device. This is not limited.

Optionally, for example, the QoS parameter is PPPR, and the maximum quantity of preemption times is X. For example, PPPR=a corresponds to X=a', and PPPR=b corresponds to X=b'. When a smallest value of PPPR corresponding to a data packet included in a MAC PDU transmitted on the sidelink is a, the terminal device determines that the MAC PDU can be preempted a' times at most.

Optionally, that the first terminal device determines the transmission priority of the first data based on the maximum quantity of preemption times includes: the first terminal device adjusts the transmission priority of the first data when a quantity of times the uplink preempts the sidelink exceeds the maximum quantity of preemption times.

Optionally, "adjust" may be understood as "increase". To be specific, the first terminal device increases the transmission priority of the first data, to ensure transmission reliability of the first data. Alternatively, optionally, in a possible case, "adjust" may be understood as "decrease". To be specific, the first terminal device decreases the transmission priority of the first data, to ensure transmission reliability of other data that collides with the first data. This is not limited.

An example in which "adjust" is understood as "increase" is used. For example, after performing LCP packet assembly, the first terminal device performs variable initialization for the maximum quantity X of preemption times of the MAC PDU transmitted on the sidelink, and sets a quantity x of times of preemption that already occurs to 0. Each time the first terminal device discards a transmission opportunity for the MAC PDU transmitted on the sidelink, the first terminal device updates x, for example, increases x by 1. When x reaches X, that is, x=X, the first terminal device increases a priority of the MAC PDU transmitted on the sidelink. For example, the priority of the MAC PDU transmitted on the sidelink may be adjusted to be always higher than that in uplink transmission, or may be increased by one level (using an example in which a PPPR value reflects the priority of the MAC PDU transmitted on the sidelink, if actual PPPR corresponding to a data packet included in the MAC PDU transmitted on the sidelink is 2, used PPPR is 1 when UL&SL priority processing is performed). In this way, sidelink transmission reliability can be ensured.

It should be understood that the quality of service parameter PPPR is used as an example for description above, and constitutes no limitation on this embodiment of this application.

It should be further understood that the embodiments of this application may be separately implemented, or may be implemented in combination. This is not limited.

The foregoing describes in detail the data transmission methods according to the embodiments of this application with reference to FIG. 1 to FIG. 6. The following describes data transmission apparatuses according to the embodiments of this application with reference to FIG. 7 to FIG. 12. It should be understood that the technical features described in the method embodiments are also applicable to the following apparatus embodiments.

Figure 7:
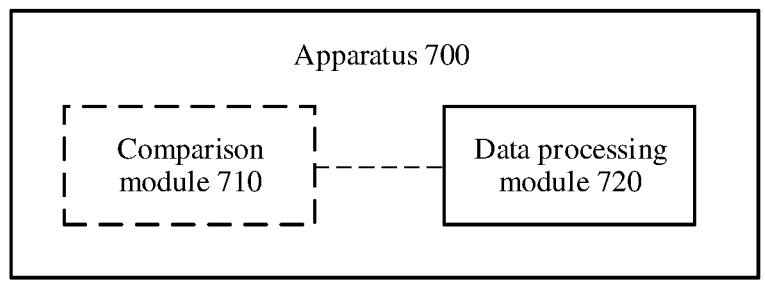
FIG. 7 is a schematic block diagram of a data transmission apparatus according to an embodiment of this application.

FIG. 7 is a schematic block diagram of a data transmission apparatus 700 according to an embodiment of this application. Optionally, a specific form of the apparatus 700 may be a V2X device (for example, a first terminal device) or a chip in the V2X device. This is not limited in this embodiment of this application. The apparatus 700 includes: a comparison module 710 (optional), configured to compare a transmission priority of first data with a transmission priority of second data; and a data processing module 720, configured to: perform medium access control MAC protocol data unit PDU assembly on the first data or not perform MAC PDU assembly on the first data based on a result of comparison between the transmission priority of the first data and the transmission priority of the second data.

The sidelink is a direct wireless communication link between the data transmission apparatus and a second terminal device, and the uplink is a wireless communication link between the data transmission apparatus and a first radio access network device.

In a possible implementation, the data processing module 720 is specifically configured to: when the transmission priority of the first data is lower than or equal to the transmission priority of the second data, not perform MAC PDU assembly on the first data; or when the transmission priority of the first data is higher than or equal to the transmission priority of the second data, perform MAC PDU assembly on the first data.

Optionally, the transmission priority of the first data and the transmission priority of the second data each correspond to any one of the following pieces of information: proSe per-packet reliability PPPR, a proSe per-packet priority PPPP, a 5G QoS identifier, and a QoS flow identifier QFI.

It should be understood that the data transmission apparatus 700 according to this embodiment of this application may correspond to the method performed by a terminal device in the foregoing method embodiment, for example, the method in FIG. 3. In addition, the foregoing and other management operations and/or functions of the modules in the apparatus 700 are separately used to implement corresponding steps of the method performed by the first terminal device in the foregoing method embodiment, and therefore, can also achieve the beneficial effects in the foregoing method embodiment. For brevity, details are not described herein again.

It should further be understood that the modules in the apparatus 700 may be implemented in a form of software and/or hardware. This is not specifically limited. In other words, the apparatus 700 is presented in a form of function modules. The "module" herein may be an application-specific integrated circuit ASIC, a circuit, a processor and a memory that execute one or more software or firmware programs, an integrated logic circuit, and/or another component that can provide the foregoing functions. Optionally, in a simple embodiment, a person skilled in the art may figure out that the apparatus 700 may be in a form shown in FIG. 8. The comparison module 710 and the data processing module 720 may be implemented by using a processor 801 and a memory 802 shown in FIG. 8. Receiving and sending actions of the apparatus 700 may be implemented by using a transceiver 803 shown in FIG. 8. Specifically, the processor 801 is implemented by executing a computer program stored in the memory. Optionally, when the apparatus 700 is a chip, receiving and sending functions and/or receiving and sending implementation processes of the apparatus 700 may be implemented by using a pin, a circuit, or the like. Optionally, the memory is a storage unit in the chip, for example, a register or a cache. The storage unit may alternatively be a storage unit, such as the memory 802 shown in FIG. 8, that is in the apparatus and that is located outside the chip.

Figure 8:
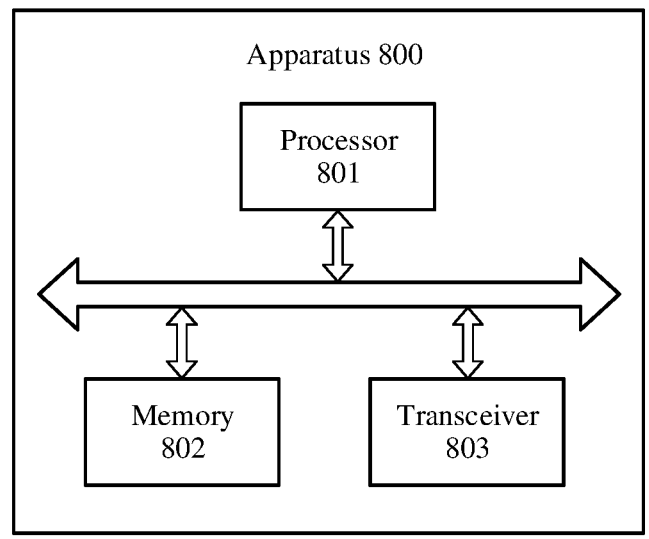
FIG. 8 is a schematic structural diagram of a data transmission apparatus according to an embodiment of this application.

FIG. 8 is a schematic structural diagram of a data transmission apparatus 800 according to an embodiment of this application. The apparatus has first data to be transmitted on a sidelink and has second data to be transmitted on an uplink. As shown in FIG. 8, the apparatus 80o includes the processor 801.

In a possible implementation, the processor 801 is configured to invoke an interface to perform the following actions: comparing a transmission priority of the first data with a transmission priority of the second data; and performing medium access control MAC protocol data unit PDU assembly on the first data or not performing MAC PDU assembly on the first data based on a result of comparison between the transmission priority of the first data and the transmission priority of the second data.

The sidelink is a direct wireless communication link between the apparatus and a second terminal device, and the uplink is a wireless communication link between the apparatus and a first radio access network device.

It should be understood that the processor 801 may invoke the interface to perform receiving and sending actions. For example, the invoked interface may be a logical interface or a physical interface. This is not limited. Optionally, the physical interface may be implemented by using a transceiver. Optionally, the apparatus 800 further includes the transceiver 803.

Optionally, the apparatus 800 further includes the memory 802, and the memory 802 may store program code in the foregoing method embodiments, so that the processor 801 invokes the program code.

For example, if the apparatus 800 includes the processor 801, the memory 802, and the transceiver 803, the processor 801, the memory 802, and the transceiver 803 communicate with each other through an inner connection path, to transmit a control signal and/or a data signal. In a possible design, the processor 801, the memory 802, and the transceiver 803 may be implemented by using a chip. The processor 801, the memory 802, and the transceiver 803 may be implemented in a same chip, or may be separately implemented in different chips, or functions of any two of the processor 801, the memory 802, and the transceiver 803 are implemented in one chip. The memory 802 may store the program code, and the processor 801 invokes the program code stored in the memory 802, to implement a corresponding function of the apparatus 800.

It should be understood that the apparatus 800 may be further configured to perform other steps and/or operations on a first terminal device side in the foregoing embodiments. For brevity, details are not described herein.

Figure 9:
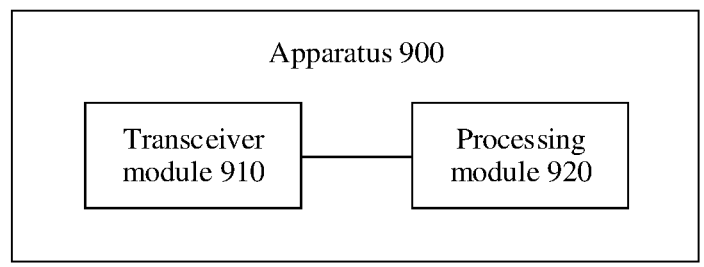
FIG. 9 is a schematic block diagram of a data transmission apparatus according to another embodiment of this application.

FIG. 9 is a schematic block diagram of a data transmission apparatus 900 according to an embodiment of this application. The apparatus 900 may exist in a form of software. Alternatively, optionally, a specific form of the apparatus 900 may be a V2X device (for example, a first terminal device) or a chip in the V2X device. This is not limited in this embodiment of this application. The apparatus 900 includes a transceiver module 910 and a processing module 920. The transceiver module 910 may include a receiving unit and a sending unit. The processing module 920 is configured to control and manage an action of the apparatus 900. The transceiver module 910 is configured to support the apparatus 900 in communicating with another device (for example, a second terminal device or a network device). Optionally, the apparatus 900 may further include a storage unit, and the storage unit is configured to store program code and data of the apparatus 900.

Optionally, each module in the apparatus 900 may be implemented by using software.

Optionally, the processing module 920 may be a processor or a controller, for example, may be a general-purpose central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processor may implement or execute various example logical blocks, modules, and circuits described with reference to content disclosed in the embodiments of this application. The processor may alternatively be a combination of processors implementing a computing function, for example, a combination of one or more microprocessors or a combination of a DSP and a microprocessor. The transceiver module 910 may be a communications interface, a transceiver, a transceiver circuit, or the like. The communications interface is a general term. In specific implementation, the communications interface may include a plurality of interfaces, for example, may include a Uu interface between a first terminal device and a network device, a PC5 interface between the first terminal device and a second terminal device, and/or other interfaces. The storage unit may be a memory.

The processing module 920 may support the apparatus 900 in performing the actions of the first terminal device in the foregoing method examples, for example, may support the apparatus 900 in performing step 420 in FIG. 4. The transceiver module 910 may support the apparatus 900 in performing step 410 in FIG. 4. For example, details may be as follows:

The transceiver module 910 is configured to: select a first transmission resource, and send, on a sidelink by using the first transmission resource, a medium access control MAC protocol data unit PDU corresponding to a first data.

The processing module 920 is configured to: if the first terminal device fails to send the MAC PDU corresponding to the first data, send, by using a second transmission resource, the MAC PDU corresponding to the first data.

The sidelink is a direct wireless communication link between the first terminal device and a second terminal device.

In a possible implementation, the first transmission resource is an $M^{th}$ group of transmission opportunities, the second transmission resource is an $(M+k)^{th}$ group of transmission opportunities, M is an integer, and k is an integer.

For example, if the MAC PDU corresponding to the first data fails to be sent, the first terminal device does not perform MAC PDU assembly for the $(M+k)^{th}$ group of transmission opportunities.

In another possible implementation, the second transmission resource is a resource that is reselected by the first terminal device and that has a same size as a resource block corresponding to the first transmission resource.

Optionally, the transceiver module 910 is further configured to: receive time information from a network device, where the time information is used to indicate a time period for sending, by the first terminal device, the MAC PDU corresponding to the first data.

For example, the processing module 920 is specifically configured to send, in the time period by using the second transmission resource, the MAC PDU corresponding to the first data.

In a possible implementation, the transceiver module 910 is further configured to receive, from the network device, a maximum quantity of transmission resources for sending the MAC PDU corresponding to the first data, where the maximum quantity of transmission resources is a maximum quantity of transmission resources to be used by the first terminal device to repeatedly send the MAC PDU corresponding to the first data.

For example, the processing module 920 is specifically configured to send, by the first terminal device based on the maximum quantity of transmission resources by using the second transmission resource, the MAC PDU corresponding to the first data.

In a possible implementation, the transceiver module 910 is further configured to: send first indication information to the second terminal device, where the first indication information carries one or more of the following pieces of information: an identifier of the first terminal device, an identifier of a hybrid automatic repeat request HARQ process to be used by the second terminal device to receive the MAC PDU corresponding to the first data, and a MAC PDU retransmission indication, and the retransmission indication is used to indicate whether the currently sent MAC PDU is the same as a previously sent MAC PDU.

It should be understood that the data transmission apparatus 900 according to this embodiment of this application may correspond to the method performed by the first terminal device in the foregoing method embodiment, for example, the method in FIG. 4. In addition, the foregoing and other management operations and/or functions of the modules in the apparatus 900 are separately used to implement corresponding steps of the method performed by the first terminal device in the foregoing method embodiment, and therefore, can also achieve the beneficial effects in the foregoing method embodiment. For brevity, details are not described herein again.

Alternatively, the apparatus 900 may be configured to perform the following functions. For example, details are as follows.

The processing module 920 is configured to obtain a specified quantity of sending times of sending a medium access control MAC protocol data unit PDU corresponding to a first data.

The transceiver module 910 is configured to send the MAC PDU based on the specified quantity of sending times by using a third transmission resource, where the third transmission resource is any transmission resource in periodic resources of the first terminal device.

A sidelink is a direct wireless communication link between the first terminal device and a second terminal device.

In a possible implementation, there is a correspondence between the specified quantity of sending times and a quality of service parameter. For example, the processing module 920 is specifically configured to: determine the specified quantity of sending times based on the correspondence and a quality of service parameter corresponding to the MAC PDU.

In a possible implementation, the transceiver module 910 is further configured to: send control information to the second terminal device, where the control information includes one or more of a new data indicator NDI, a redundancy version RV identifier, and a time-frequency resource indicator, and the time-frequency resource indicator is used to indicate a time-frequency resource location of the third transmission resource.

Alternatively, the apparatus 900 may be configured to perform the following functions. For example, details are as follows.

An obtaining module (not shown in FIG. 9) is configured to obtain a maximum quantity of preemption times of sending a medium access control MAC protocol data unit PDU corresponding to a first data, where the maximum quantity of preemption times is a maximum quantity of times the first terminal device can preempt, when the first terminal device transmits second data on an uplink, the first data transmitted on a sidelink.

The processing module 920 is configured to determine a transmission priority of the first data based on the maximum quantity of preemption times.

The transceiver module 910 is configured to transmit, based on the transmission priority of the first data, the MAC PDU corresponding to the first data.

The sidelink is a direct wireless communication link between the first terminal device and a second terminal device, and the uplink is a wireless communication link between the first terminal device and a first radio access network device.

In a possible implementation, the processing module 920 is specifically configured to: adjust the transmission priority of the first data when a quantity of times the uplink preempts the sidelink exceeds the maximum quantity of preemption times.

In a possible implementation, there is an association relationship between the maximum quantity of preemption times and a quality of service parameter. For example, the obtaining module is specifically configured to: determine the maximum quantity of preemption times based on the association relationship and a quality of service parameter corresponding to the MAC PDU corresponding to the first data.

It should be understood that the modules in the apparatus 900 may be implemented in a form of software and/or hardware. This is not specifically limited. In other words, the apparatus 900 is presented in a form of function modules. The "module" herein may be an application-specific integrated circuit ASIC, a circuit, a processor and a memory that execute one or more software or firmware programs, an integrated logic circuit, and/or another component that can provide the foregoing functions. Optionally, in a simple embodiment, a person skilled in the art may figure out that the apparatus 900 may be in a form shown in FIG. 10. The processing module 920 may be implemented by using a processor 1001 and a memory 1002 shown in FIG. 10. The transceiver module 910 may be implemented by using a transceiver 1003 shown in FIG. 10. Specifically, the processor is implemented by executing a computer program stored in the memory. Optionally, when the apparatus 900 is a chip, a function and/or an implementation process of the transceiver module 910 may be alternatively implemented by using a pin, a circuit, or the like. Optionally, the memory is a storage unit in the chip, for example, a register or a cache. The storage unit may alternatively be a storage unit, such as the memory 1002 shown in FIG. 10, that is in the apparatus and that is located outside the chip.

Figure 10:
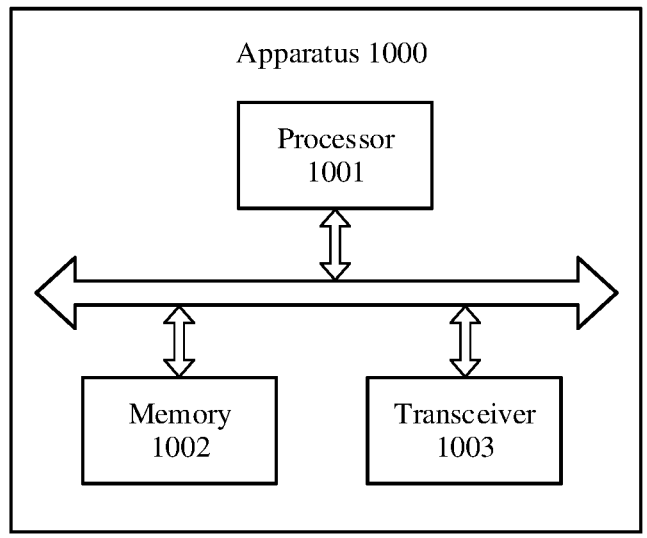
FIG. 10 is a schematic structural diagram of a data transmission apparatus according to another embodiment of this application.

FIG. 10 is a schematic structural diagram of a data transmission apparatus 1000 according to an embodiment of this application. The apparatus 1000 has first data to be transmitted on a sidelink and has second data to be transmitted on an uplink. The sidelink is a direct wireless communication link between the apparatus and a second terminal device, and the uplink is a wireless communication link between the apparatus and a first radio access network device. As shown in FIG. 10, the apparatus 1000 includes the processor 1001.

In a possible implementation, the processor 1001 is configured to invoke an interface to perform the following actions: selecting a first transmission resource, and sending, on the sidelink by using the first transmission resource, a medium access control MAC protocol data unit PDU corresponding to the first data; and if the apparatus fails to send the MAC PDU corresponding to the first data, sending, by using a second transmission resource, the MAC PDU corresponding to the first data.

In a possible implementation, the processor 1001 is configured to invoke an interface to perform the following actions: obtaining a specified quantity of sending times of sending a medium access control MAC protocol data unit PDU corresponding to the first data; and sending the MAC PDU based on the specified quantity of sending times by using a third transmission resource, where the third transmission resource is any transmission resource in periodic resources of the first terminal device.

In a possible implementation, the processor 1001 is configured to invoke an interface to perform the following action: obtaining a maximum quantity of preemption times of sending a medium access control MAC protocol data unit PDU corresponding to the first data, where the maximum quantity of preemption times is a maximum quantity of times the first terminal device can preempt, when the first terminal device transmits the second data on the uplink, the first data transmitted on the sidelink. The processor 1001 is configured to determine a transmission priority of the first data based on the maximum quantity of preemption times. The processor 1001 is configured to invoke the interface to transmit, based on the transmission priority of the first data, the MAC PDU corresponding to the first data.

It should be understood that the processor 1001 may invoke the interface to perform the foregoing receiving and sending actions. The invoked interface may be a logical interface or a physical interface. This is not limited. Optionally, the physical interface may be implemented by using a transceiver. Optionally, the apparatus 1000 further includes the transceiver 1003.

Optionally, the apparatus 1000 further includes the memory 1002, and the memory 1002 may store program code in the foregoing method embodiments, so that the processor 1001 invokes the program code.

For example, if the apparatus 1000 includes the processor 1001, the memory 1002, and the transceiver 1003, the processor 1001, the memory 1002, and the transceiver 1003 communicate with each other through an inner connection path, to transmit a control signal and/or a data signal. In a possible design, the processor 1001, the memory 1002, and the transceiver 1003 may be implemented by using a chip. The processor 1001, the memory 1002, and the transceiver 1003 may be implemented in a same chip, or may be separately implemented in different chips, or functions of any two of the processor 1001, the memory 1002, and the transceiver 1003 are implemented in one chip. The memory 1002 may store the program code, and the processor 1001 invokes the program code stored in the memory 1002, to implement a corresponding function of the apparatus 1000.

It should be understood that the apparatus 1000 may be further configured to perform other steps and/or operations on a first terminal device side in the foregoing embodiments. For brevity, details are not described herein.

Figure 11:
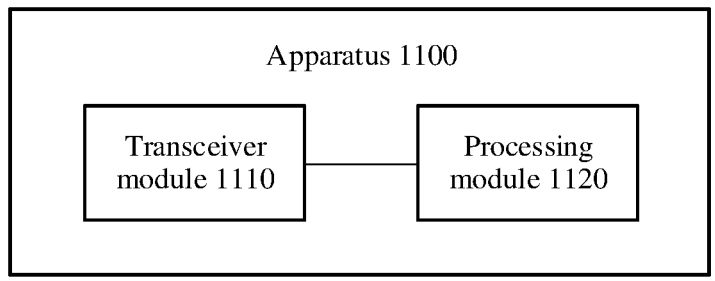
FIG. 11 is a schematic block diagram of a data transmission apparatus according to still another embodiment of this application.

FIG. 11 is a schematic block diagram of a data transmission apparatus 1100 according to an embodiment of this application. The apparatus 1100 may exist in a form of software. Alternatively, optionally, a specific form of the apparatus 1100 may be a V2X device (for example, a second terminal device) or a chip in the V2X device. This is not limited in this embodiment of this application. The apparatus 1100 includes a transceiver module 1110 and a processing module 1120. The transceiver module 1110 may include a receiving unit and a sending unit. The processing module 1120 is configured to control and manage an action of the apparatus 1100. The transceiver module 1110 is configured to support the apparatus 1100 in communicating with another device (for example, a first terminal device or a network device). Optionally, the apparatus 1100 may further include a storage unit, and the storage unit is configured to store program code and data of the apparatus 1100.

Optionally, each module in the apparatus 1100 may be implemented by using software.

Optionally, the processing module 1120 may be a processor or a controller, for example, may be a general-purpose central processing unit CPU, a general-purpose processor, a digital signal processor DSP, an application-specific integrated circuit ASIC, a field programmable gate array FPGA or another programmable logic device, a transistor logic device, a hardware component, or any combination thereof. The processor may implement or execute various example logical blocks, modules, and circuits described with reference to content disclosed in the embodiments of this application. The processor may alternatively be a combination of processors implementing a computing function, for example, a combination of one or more microprocessors or a combination of a DSP and a microprocessor. The transceiver module 1110 may be a communications interface, a transceiver, a transceiver circuit, or the like. The communications interface is a general term. In specific implementation, the communications interface may include a plurality of interfaces, for example, may include a Uu interface between a second terminal device and a network device, a PC5 interface between the second terminal device and a first terminal device, and/or other interfaces. The storage unit may be a memory.

The processing module 1120 may support the apparatus 1100 in performing the actions of the second terminal device in the foregoing method examples. For example, details may be as follows:

The transceiver module 1110 is configured to receive first indication information from a first terminal device on a sidelink, where the first indication information carries one or more of the following pieces of information: an identifier of the first terminal device, an identifier of a hybrid automatic repeat request HARQ process to be used by the apparatus 1100 to receive a medium access control MAC protocol data unit PDU, and a MAC PDU retransmission indication, and the retransmission indication is used to indicate whether a currently sent MAC PDU is the same as a previously sent MAC PDU.

The transceiver module 1110 is further configured to receive, from the first terminal device on the sidelink, a MAC PDU corresponding to first data.

The processing module 1120 is configured to decode, based on the first indication information, the MAC PDU corresponding to the first data.

The sidelink is a direct wireless communication link between the first terminal device and the second terminal device.

Optionally, the retransmission indication is used to indicate that the currently sent PDU is the same as the previously sent PDU.

For example, the processing module 1120 is specifically configured to combine a previously received MAC PDU and the currently received MAC PDU corresponding to the first data.

It should be understood that the data transmission apparatus 1100 according to this embodiment of this application may correspond to the method performed by the second terminal device in the foregoing method embodiment. In addition, the foregoing and other management operations and/or functions of the modules in the apparatus 1100 are separately used to implement corresponding steps of the method performed by the second terminal device in the foregoing method embodiment, and therefore, can also achieve the beneficial effects in the foregoing method embodiment. For brevity, details are not described herein again.

Alternatively, the apparatus 1100 may be configured to perform the following functions. Details are as follows.

The transceiver module 1110 is configured to receive control information from a first terminal device, where the control information includes one or more of a new data indicator NDI, a redundancy version RV identifier, and a time-frequency resource indicator, and the time-frequency resource indicator is used to indicate a time-frequency resource location of a third transmission resource.

The transceiver module 1110 is further configured to: receive, on the third transmission resource based on the control information, a MAC PDU corresponding to first data, and process the MAC PDU based on the NDI and the RV identifier.

It should further be understood that the modules in the apparatus 1100 may be implemented in a form of software and/or hardware. This is not specifically limited. In other words, the apparatus 1100 is presented in a form of function modules. The "module" herein may be an application-specific integrated circuit ASIC, a circuit, a processor and a memory that execute one or more software or firmware programs, an integrated logic circuit, and/or another component that can provide the foregoing functions. Optionally, in a simple embodiment, a person skilled in the art may figure out that the apparatus 1100 may be in a form shown in FIG. 12. The processing module 1120 may be implemented by using a processor 1201 and a memory 1202 shown in FIG. 12. The transceiver module 1110 may be implemented by using a transceiver 1203 shown in FIG. 12. For example, the processor is implemented by executing a computer program stored in the memory. Optionally, when the apparatus 1100 is a chip, a function and/or an implementation process of the transceiver module 1110 may be alternatively implemented by using a pin, a circuit, or the like. Optionally, the memory is a storage unit in the chip, for example, a register or a cache. The storage unit may alternatively be a storage unit, such as the memory 1202 shown in FIG. 12, that is in the apparatus and that is located outside the chip.

Figure 12:
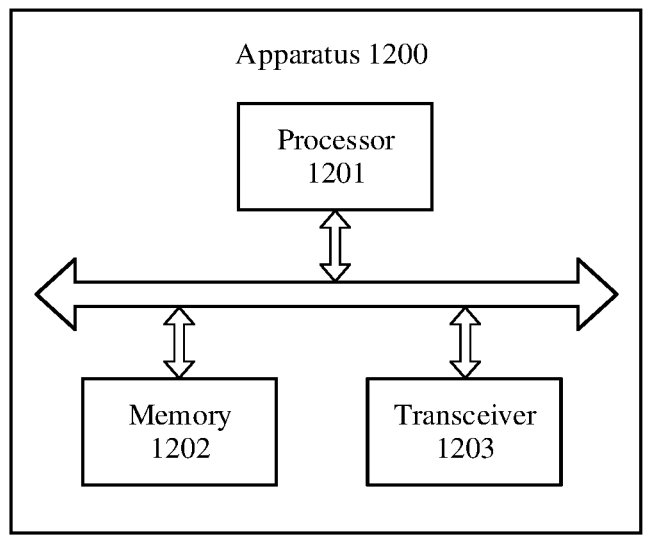
FIG. 12 is a schematic structural diagram of a data transmission apparatus according to still another embodiment of this application.

FIG. 12 is a schematic structural diagram of a data transmission apparatus 1200 according to an embodiment of this application. As shown in FIG. 12, the apparatus 1200 includes the processor 1201.

In a possible implementation, the processor 1201 is configured to invoke an interface to perform the following actions: receiving first indication information from a first terminal device on a sidelink, where the first indication information carries one or more of the following pieces of information: an identifier of the first terminal device, an identifier of a hybrid automatic repeat request HARQ process to be used by the apparatus to receive a medium access control MAC protocol data unit PDU, and a MAC PDU retransmission indication, and the retransmission indication is used to indicate whether a currently sent MAC PDU is the same as a previously sent MAC PDU; and receiving, from the first terminal device on the sidelink, a MAC PDU corresponding to first data. The processor 1201 is further configured to decode, based on the first indication information, the MAC PDU corresponding to the first data. The sidelink is a direct wireless communication link between the first terminal device and the apparatus 1200.

In a possible implementation, the processor 1201 is configured to invoke an interface to perform the following actions: receiving control information from a first terminal device, where the control information includes one or more of a new data indicator NDI, a redundancy version RV identifier, and a time-frequency resource indicator, and the time-frequency resource indicator is used to indicate a time-frequency resource location of a third transmission resource; and receiving, on the third transmission resource based on the control information, a MAC PDU corresponding to first data, and processing the MAC PDU based on the NDI and the RV identifier.

It should be understood that the processor 1201 may invoke the interface to perform the foregoing receiving and sending actions. The invoked interface may be a logical interface or a physical interface. This is not limited. Optionally, the physical interface may be implemented by using a transceiver. Optionally, the apparatus 1200 further includes the transceiver 1203.

Optionally, the apparatus 1200 further includes the memory 1202, and the memory 1202 may store program code in the foregoing method embodiments, so that the processor 1201 invokes the program code.

For example, if the apparatus 1200 includes the processor 1201, the memory 1202, and the transceiver 1203, the processor 1201, the memory 1202, and the transceiver 1203 communicate with each other through an inner connection path, to transmit a control signal and/or a data signal. In a possible design, the processor 1201, the memory 1202, and the transceiver 1203 may be implemented by using a chip. The processor 1201, the memory 1202, and the transceiver 1203 may be implemented in a same chip, or may be separately implemented in different chips, or functions of any two of the processor 1201, the memory 1202, and the transceiver 1203 are implemented in one chip. The memory 1202 may store the program code, and the processor 1201 invokes the program code stored in the memory 1202, to implement a corresponding function of the apparatus 1200.

It should be understood that the apparatus 1200 may be further configured to perform other steps and/or operations on a second terminal device side in the foregoing embodiments. For brevity, details are not described herein.

This application further provides a chip. The chip may be used in a communications apparatus, for example, a first terminal device, a second terminal device, or a network device. The chip includes at least one processor, and when the at least one processor executes an instruction, the chip or the communications apparatus is enabled to perform any one of the embodiments of this application. The chip may further include a memory, and the memory may be configured to store the related instruction.

It should be understood that in the embodiments of this application, numbers "first", "second", and the like are merely used to distinguish between different objects, for example, to distinguish between different terminal devices or transmission, and do not constitute a limitation on the scope of the embodiments of this application. This application is not limited thereto.

It should be further understood that the solutions in the embodiments of this application may be properly combined for use, and explanations or descriptions of some terms (for example, collision, sidelink, and uplink) in the embodiments may be mutually referenced or explained in the embodiments. This is not limited.

It should be further understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in the embodiments of the present invention. The execution sequences of the processes should be determined based on functions and internal logic of the processes, and should not be construed as any limitation on the implementation processes of the embodiments of the present invention.

The method disclosed in the embodiments of this application may be applied to a processor or may be implemented by a processor. The processor may be an integrated circuit chip and has a signal processing capability. In an implementation process, the steps in the foregoing method embodiments may be completed by using a hardware integrated logic circuit in the processor or instructions in a form of software. The processor may be a general-purpose processor, a digital signal processor (DSP), an application-specific integrated circuit (ASIC), a field programmable gate array (FPGA) or another programmable logic device, a discrete gate or a transistor logic device, a discrete hardware component, a system on chip (SoC), a central processing unit (CPU), a network processor (NP), a digital signal processing (DSP) circuit, a micro controller unit (MCU), a programmable logic device (PLD), or another integrated chip. The processor may implement or perform the methods, steps, and logical block diagrams that are disclosed in the embodiments of this application. The general-purpose processor may be a microprocessor, or the processor may be any conventional processor or the like. The steps of the methods disclosed with reference to the embodiments of this application may be directly executed and completed by using a hardware decoding processor, or may be executed and completed by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information from the memory and completes the steps in the foregoing methods in combination with hardware of the processor.

It may be understood that the memory in the embodiments of this application may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) that is used as an external cache. By way of example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that, the memory in the system and method described in this specification includes but is not limited to these memories and any memory of another proper type.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the method embodiments. Details are not described herein again.

In the several embodiments provided in this application, it should be understood that the disclosed system, apparatus, and method may be implemented in another manner. For example, the described apparatus embodiments are merely examples. For example, division into the units is merely logical function division. There may be another division manner in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions of the embodiments.

In addition, function units in the embodiments of this application may be integrated into one processing unit, or each of the units may exist alone physically, or two or more units may be integrated into one unit.

When the functions are implemented in a form of a software function unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory ROM, a random access memory RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method applied to a first terminal device or a chip of the first terminal device, the method comprising:
  obtaining a specified quantity of sending times of sending a medium access control (MAC) protocol data unit (PDU) corresponding to first data, wherein the first data is to be sent by the first terminal device to a second terminal device on a sidelink, and the sidelink is a direct wireless communication link between the first terminal device and the second terminal device; and
  sending, using a transmission resource, the MAC PDU on the sidelink based on the specified quantity of sending times, wherein the transmission resource is any transmission resource in periodic resources of the first terminal device,
wherein obtaining the specified quantity of sending times of sending the MAC PDU corresponding to the first data comprises:
determining the specified quantity of sending times based on a quality of service parameter corresponding to the MAC PDU, and based on a correspondence between the specified quantity of sending times and the quality of service parameter corresponding to the MAC PDU.

2. The method according to claim 1, further comprising:
sending control information to the second terminal device, wherein the control information comprises a new data indicator (NDI), a redundancy version (RV) identifier, and a time-frequency resource indicator, and the time-frequency resource indicator indicates a time-frequency resource location of the third transmission resource.

3. The method according to claim 1, further comprising, before sending the MAC PDU based on the specified quantity of sending times, and in response to a sidelink transmission opportunity and an uplink transmission opportunity of the first terminal device overlapping in time domain:
comparing, by the first terminal device, a transmission priority of the first data with a transmission priority of second data,
determining, by the first terminal device based on a comparison result, whether or not to discard the sidelink transmission opportunity, and
in response to a determination that the sidelink transmission opportunity is not discarded, performing, by the first terminal device, MAC PDU assembly on the first data.

4. The method of claim 3, wherein the determination that the sidelink transmission opportunity is not discarded is made in response to the transmission priority of the first data being greater than the transmission priority of the second data.

5. The method of claim 3, wherein the transmission priority of the first data and the transmission priority of the second data each correspond to any one of the following: a proSe per-packet reliability (PPPR), proSe per-packet priority (PPPP), a 5G quality of service (QoS) identifier, or a QoS flow identifier (QFI).

6. The method of claim 1, wherein the periodic resources of the first terminal device are allocated by a network device.

7. The method of claim 1, wherein the specified quantity of sending times is obtained via radio resource control (RRC) dedicated signaling.

8. The method according to claim 1, wherein sending, using the transmission resource, the MAC PDU on the sidelink based on specified quantity of sending times comprises sending the MAC PDU on the sidelink without distinguishing between an initial transmission opportunity and a retransmission opportunity.

9. An apparatus, comprising:
at least one processor; and
a non-transitory memory storing instructions for execution by the at least one processor;
wherein, when executed by the at least one processor, the instructions cause the apparatus to perform operations comprising:
obtaining a specified quantity of sending times of sending a medium access control (MAC) protocol data unit a (PDU) corresponding to first data, wherein the first data is to be sent by the apparatus to a second terminal device on a sidelink, and the sidelink is a direct wireless communication link between a first terminal device and the second terminal device; and
sending the MAC PDU based on the specified quantity of sending times using a transmission resource, wherein the transmission resource is any transmission resource in periodic resources of the apparatus, wherein obtaining the specified quantity of sending times of sending the MAC PDU corresponding to the first data comprises:
determining the specified quantity of sending times based on a quality of service Parameter corresponding to the MAC PDU, and based on a correspondence between the specified quantity of sending times and the quality of service parameter corresponding to the MAC PDU.

10. The apparatus according to claim 9, wherein the instructions further cause the apparatus to perform operations comprising:
sending control information to the second terminal device, wherein the control information comprises a new data indicator (NDI), a redundancy version (RV) identifier, and a time-frequency resource indicator, and the time-frequency resource indicator indicates a time-frequency resource location of the transmission resource.

11. The apparatus according to claim 9, wherein the instructions further cause the apparatus to perform operations comprising, before sending the MAC PDU based on the specified quantity of sending times, and in response to a sidelink transmission opportunity and an uplink transmission opportunity of the first terminal device overlapping in time domain:
comparing a transmission priority of the first data with a transmission priority of second data,
determining, based on a comparison result, whether or not to discard the sidelink transmission opportunity, and
in response to a determination that the sidelink transmission opportunity is not discarded, performing MAC PDU assembly on the first data.

12. The apparatus according to claim 11, wherein the determination that the sidelink transmission opportunity is not discarded is made in response to the transmission priority of the first data being greater than the transmission priority of the second data.

13. The apparatus according to claim 11, wherein the transmission priority of the first data and the transmission priority of the second data each correspond to any one of the following: a proSe per-packet reliability (PPPR), proSe per-packet priority (PPPP), a 5G quality of service (QoS) identifier, or a QoS flow identifier (QFI).

14. The apparatus according to claim 9, wherein the periodic resources of the first terminal device are allocated by a network device.

15. The apparatus according to claim 9, wherein the specified quantity of sending times is obtained via radio resource control (RRC) dedicated signaling.

16. The apparatus according to claim 9, wherein sending the MAC PDU on the sidelink based on the specified quantity of sending times comprises sending the MAC PDU on the sidelink without distinguishing between an initial transmission opportunity and a retransmission opportunity.

17. A non-transitory computer readable medium with computer readable instructions stored thereon, wherein the instructions, when executed by at least one processor, cause the at least one processor to perform the steps of:

obtaining a specified quantity of sending times of sending a medium access control (MAC) protocol data unit a (PDU) corresponding to first data, wherein the first data is to be sent to a second terminal device on a sidelink, and the sidelink is a direct wireless communication link between a first terminal device and the second terminal device; and sending the MAC PDU based on the specified quantity of sending times using a transmission resource, wherein the transmission resource is any transmission resource in periodic resources of an apparatus, wherein obtaining the specified quantity of sending times of sending the MAC PDU corresponding to the first data comprises:

determining the specified quantity of sending times based on a quality of service parameter corresponding to the MAC PDU, and based on a correspondence between the specified quantity of sending times and the quality of service parameter corresponding to the MAC PDU.

18. The non-transitory computer readable medium according to claim 17, wherein the instructions, when executed by the at least one processor, further cause the at least one processor to perform the step of:

sending control information to the second terminal device, wherein the control information comprises a new data indicator (NDI), a redundancy version (RV) identifier, and a time-frequency resource indicator, and the time-frequency resource indicator indicates a time-frequency resource location of the transmission resource.

19. The non-transitory computer readable medium according to claim 17, wherein the instructions, when executed by the at least one processor, further cause the at least one processor to perform the step of:

before sending the MAC PDU based on the specified quantity of sending times, and in response to a sidelink transmission opportunity and an uplink transmission opportunity of the first terminal device overlapping in time domain:

comparing a transmission priority of the first data with a transmission priority of second data, determining, based on a comparison result, whether or not to discard the sidelink transmission opportunity, and in response to a determination that the sidelink transmission opportunity is not discarded, performing MAC PDU assembly on the first data.

20. The non-transitory computer readable medium according to claim 17, wherein sending the MAC PDU on the sidelink based on the specified quantity of sending times comprises sending the MAC PDU on the sidelink without distinguishing between an initial transmission opportunity and a retransmission opportunity.

\* \* \* \* \*

UNITED STATES PATENT AND TRADEMARK OFFICE
CERTIFICATE OF CORRECTION

| | |
|---|---|
| PATENT NO. | : 12,003,326 B2 |
| APPLICATION NO. | : 17/205641 |
| DATED | : June 4, 2024 |
| INVENTOR(S) | : Fan et al. |

It is certified that error appears in the above-identified patent and that said Letters Patent is hereby corrected as shown below:

In the Claims

In Column 37, in Claim 2, Line 19, after "of the" delete "third".

In Column 38, in Claim 9, Line 15, delete "Parameter" and insert -- parameter --.

Signed and Sealed this
Sixteenth Day of July, 2024

Katherine Kelly Vidal
*Director of the United States Patent and Trademark Office*